United States Patent
Okabe et al.

(10) Patent No.: US 8,974,570 B2
(45) Date of Patent: Mar. 10, 2015

(54) RETAINING SEAL MATERIAL AND EXHAUST GAS PURIFYING APPARATUS

(71) Applicant: Ibiden Co., Ltd., Ogaki-shi, Gifu (JP)

(72) Inventors: Takahiko Okabe, Takahama (JP); Keiji Kumano, Takahama (JP)

(73) Assignee: Ibiden Co., Ltd., Ogaki-shi (JP)

( * ) Notice: Subject to any disclaimer, the term of this patent is extended or adjusted under 35 U.S.C. 154(b) by 132 days.

(21) Appl. No.: 13/804,086

(22) Filed: Mar. 14, 2013

(65) Prior Publication Data

US 2013/0255210 A1   Oct. 3, 2013

(30) Foreign Application Priority Data

Apr. 3, 2012 (JP) ................. 2012-084991

(51) Int. Cl.
| | | |
|---|---|---|
| B01D 50/00 | (2006.01) | |
| B01D 39/20 | (2006.01) | |
| B01D 39/14 | (2006.01) | |
| B01D 39/06 | (2006.01) | |
| B01D 24/00 | (2006.01) | |
| D01F 9/08 | (2006.01) | |
| B01D 46/00 | (2006.01) | |
| B32B 5/06 | (2006.01) | |
| B32B 5/26 | (2006.01) | |
| B32B 1/08 | (2006.01) | |

(52) U.S. Cl.
CPC .............. D01F 9/08 (2013.01); B01D 46/0005 (2013.01); B01D 46/00 (2013.01); B32B 5/06 (2013.01); B32B 5/26 (2013.01); B32B 1/08 (2013.01); *B32B 2262/10* (2013.01)

USPC ................. 55/523; 55/522; 55/524; 422/169; 422/170; 422/171; 422/172; 422/177; 422/178; 422/179; 422/180; 422/181; 422/182

(58) Field of Classification Search
CPC ...... D01F 9/08; B01D 46/0005; B01D 46/00; B32B 5/06; B32B 5/26; B32B 1/08; B32B 2262/10; F01N 3/2653; F01N 3/2857; F01N 3/2864; F01N 3/0211
USPC ............. 55/522–524; 422/169–172, 177–182
See application file for complete search history.

(56) References Cited

U.S. PATENT DOCUMENTS

| | | | |
|---|---|---|---|
| 2009/0049690 A1 | 2/2009 | Eguchi | |
| 2009/0304560 A1* | 12/2009 | Dietz | 422/179 |
| 2010/0209308 A1 | 8/2010 | Kunze et al. | |
| 2011/0126499 A1* | 6/2011 | Kumar | 55/495 |
| 2013/0255209 A1 | 10/2013 | Okabe et al. | |

(Continued)

FOREIGN PATENT DOCUMENTS

| | | |
|---|---|---|
| CN | 1392921 | 1/2003 |
| CN | 1816391 | 8/2006 |
| CN | 101023247 | 8/2007 |

(Continued)

*Primary Examiner* — Amber Orlando
(74) *Attorney, Agent, or Firm* — Mori & Ward, LLP

(57) ABSTRACT

A retaining seal material includes inorganic fibers, inorganic particles adhering to surfaces of the inorganic fibers, a first principal surface, and a second principal surface. A mean particle diameter of the inorganic particles in a vicinity of a center in a thickness direction of the retaining seal material is smaller than at least one of a mean particle diameter of the inorganic particles in a vicinity of the first principal surface and a mean particle diameter of the inorganic particles in a vicinity of the second principal surface.

8 Claims, 9 Drawing Sheets

(56) References Cited

U.S. PATENT DOCUMENTS

| | | |
|---|---|---|
| 2013/0305697 A1 | 11/2013 | Sako |
| 2014/0010722 A1 | 1/2014 | Matsuo et al. |

FOREIGN PATENT DOCUMENTS

| | | |
|---|---|---|
| CN | 101460717 | 6/2009 |
| CN | 101883917 | 11/2010 |
| DE | 10 2013 205 308 | 10/2013 |
| JP | 2000-130150 | 5/2000 |
| JP | 2002-206421 | 7/2002 |
| JP | 2003-080031 | 3/2003 |
| JP | 2005-040646 | 2/2005 |
| JP | 2008-505276 | 2/2008 |
| JP | 2008-506886 | 3/2008 |
| JP | 2009-508044 | 2/2009 |

* cited by examiner

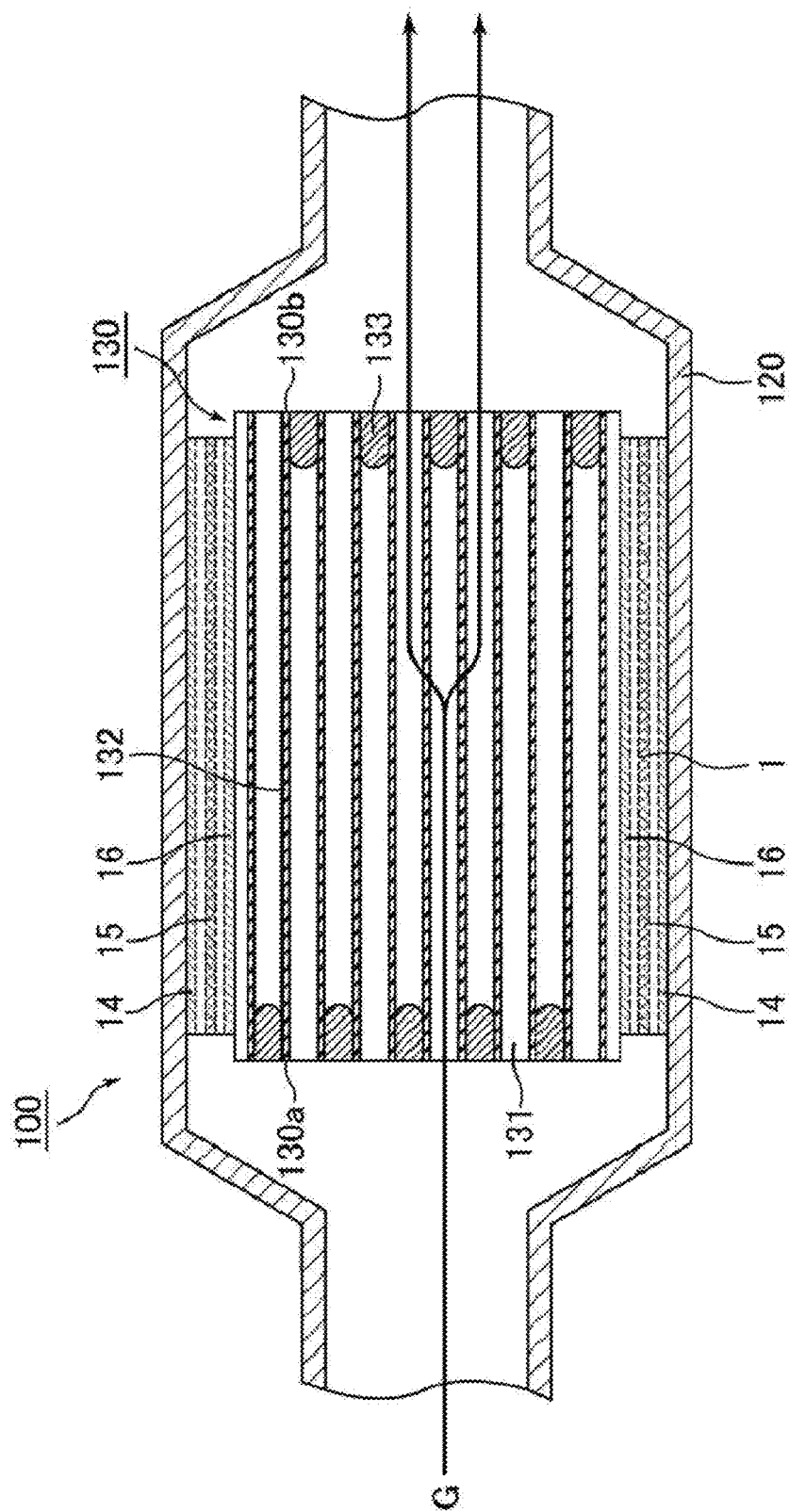

RETAINING SEAL MATERIAL AND EXHAUST GAS PURIFYING APPARATUS

CROSS-REFERENCE TO RELATED APPLICATIONS

The present application claims priority under 35 U.S.C. §119 to Japanese Patent Application No. 2012-084991, filed Apr. 3, 2012. The contents of this application are incorporated herein by reference in their entirety.

BACKGROUND OF THE INVENTION

1. Field of the Invention

The present invention relates to a retaining seal material and an exhaust gas purifying apparatus.

2. Discussion of the Background

Particulate matter (hereinafter also referred to as PM) is contained in an exhaust gas exhausted from internal combustion engines, such as a diesel engine. In recent years, there has been a problem in that this PM causes harm to the environment and the human body. Additionally, since harmful gas components, such as CO, HC, or NOx, are also contained in the exhaust gas, there has also been a concern about the influence that the harmful gas components have on the environment and the human body.

Thus, as exhaust gas purifying apparatuses that trap the PM in the exhaust gas or purifies the harmful gas components, various exhaust gas purifying apparatuses that are constituted by an exhaust gas treatment body made of porous ceramics, such as silicon carbide or cordierite, a metal casing that houses the exhaust gas treatment body, and a retaining seal material that is disposed between the exhaust gas treatment body and the metal casing are suggested. This retaining seal material is disposed primarily for the purposes of preventing the exhaust gas treatment body from coming into contact with the metal casing covering an outer periphery thereof and being damaged due to vibration or impact generated by the traveling or the like of an automobile, and of preventing the exhaust gas from leaking from between the exhaust gas treatment body and the metal casing.

Here, since the internal combustion engines operate in a condition close to a theoretical air fuel ratio for the purpose of improvement in fuel consumption, the exhaust gas tends to have high temperature and high pressure. If the high-temperature and high-pressure exhaust gas reaches an exhaust gas purifying apparatus, the retaining seal material requires the retaining force of the exhaust gas treatment body that does not change even by slight fluctuation in the interval between the exhaust gas treatment body and the metal casing because the interval therebetween may fluctuate due to a difference in the coefficient of thermal expansion between the exhaust gas treatment body and the metal casing.

In order to improve the retaining performance of the retaining seal material, making inorganic particles adhere to the surfaces of the inorganic fibers is described in Japanese Unexamined Patent Application Publication No. 2002-206421 and PCT Japanese Translation Publication No. 2008-505276. Additionally, imparting inorganic particles to the surface of the retaining seal material is described in PCT Japanese Translation Publication No. 2009-508044 and PCT Japanese Translation Publication No. 2008-506886.

In the technique described in Japanese Unexamined Patent Application Publication No. 2002-206421, the inorganic particles are made to adhere to the surfaces of the inorganic fibers so that degradation of the surface pressure of the retaining seal material with time is not easily caused. Additionally, in the technique described in PCT Japanese Translation Publication No. 2008-505276, the inorganic particles are made to adhere to the surfaces of the inorganic fibers in order to improve the surface pressure of the retaining seal material.

In the technique described in PCT Japanese Translation Publication No. 2009-508044 and PCT Japanese Translation Publication No. 2008-506886, the inorganic particles are imparted to the surface of the retaining seal material in order to improve the frictional coefficient of the surface of the retaining seal material.

SUMMARY OF THE INVENTION

According to one aspect of the present invention, a retaining seal material includes inorganic fibers, inorganic particles adhering to surfaces of the inorganic fibers, a first principal surface, and a second principal surface. A mean particle diameter of the inorganic particles in a vicinity of a center in a thickness direction of the retaining seal material is smaller than at least one of a mean particle diameter of the inorganic particles in a vicinity of the first principal surface and a mean particle diameter of the inorganic particles in a vicinity of the second principal surface.

According to another aspect of the present invention, an exhaust gas purifying apparatus includes an exhaust gas treatment body, a metal casing that houses the exhaust gas treatment body, and the retaining seal material disposed between the exhaust gas treatment body and the metal casing and retains the exhaust gas treatment body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a cross-sectional view schematically showing an example of an exhaust gas purifying apparatus related to the first embodiment of the invention.

DESCRIPTION OF THE EMBODIMENTS

Figure 1:
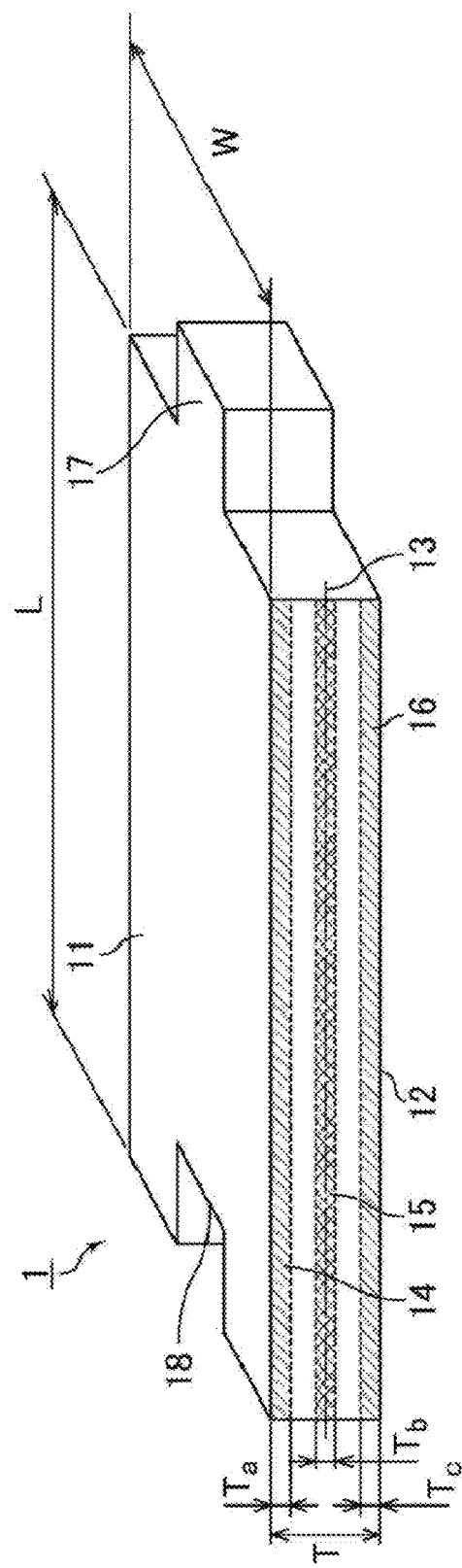
FIG. 1 is a perspective view schematically showing an example of a retaining seal material related to a first embodiment of the invention.

A retaining seal material according to an embodiment of the present invention contains inorganic fibers and inorganic particles adhering to the surfaces of the inorganic fibers, and includes a first principal surface and a second principal surface, and the mean particle diameter of the inorganic particles in the vicinity of the center in a thickness direction of the retaining seal material is smaller than at least any one of the mean particle diameter of the inorganic particles in the vicinity of the first principal surface and the mean particle diameter of the inorganic particles in the vicinity of the second principal surface.

First, in the retaining seal material according to the embodiment of the present invention, the surface pressure of the retaining seal material can be improved because the inorganic particles adhere to the surfaces of the inorganic fibers.

Additionally, in the retaining seal material according to the embodiment of the present invention, the mean particle diameter of the inorganic particles in the vicinity of the center in the thickness direction of the retaining seal material is smaller than at least one of the mean particle diameters of the inorganic particles in the vicinity of the first principal surface and the vicinity of the second principal surface in the retaining seal material.

If the inorganic particles adhere to the surface of the retaining seal material, the frictional coefficient of the surface of the retaining seal material can be improved.

Here, since irregularities of the surface of the retaining seal material become large if the mean particle diameter of the inorganic particles on the surface of the retaining seal material is large, the frictional coefficient of the surface of the retaining seal material can be further increased.

On the other hand, if the inorganic particles with large mean particle diameter adhere to the whole retaining seal material, the retaining seal material becomes hard and the retaining seal material is not easily bent.

Thus, in the retaining seal material according to the embodiment of the present invention, the retaining seal material can be easily bent by making the mean particle diameter of the inorganic particles in the vicinity of the center in the thickness direction of the retaining seal material smaller than at least one of the mean particle diameters of the inorganic particles in the vicinity of the first principal surface and the vicinity of the second principal surface in the retaining seal material.

It is believed that this is because, if the mean particle diameter of the inorganic particles in the vicinity of the center in the thickness direction of the retaining seal material is small, the frictional force between the inorganic fibers in the vicinity of the center in the thickness direction of the retaining seal material becomes small, and consequently, the inorganic fibers do not easily crack, and the flexibility of the retaining seal material is easily improved.

By changing the mean particle diameter of the inorganic particles in the thickness direction of the retaining seal material in this way, a retaining seal material that has the effect of improving the surface pressure of the retaining seal material and the effect of improving the frictional coefficient of the surface of the retaining seal material and that is easily bent can be provided.

In addition, the "vicinity of the first principal surface" represents a region obtained by cutting a region of 1 mm in the thickness direction from one principal surface of the principal surfaces of the retaining seal material.

Additionally, the "vicinity of the center in the thickness direction" represents a region obtained by cutting a region of 0.5 mm above and below a centerline, that is, a region of 1 mm in total when a line that cuts the retaining seal material so that the thickness thereof becomes half is defined as "the centerline in the thickness direction".

Additionally, the "vicinity of the second principal surface" represents a region obtained by cutting a region of 1 mm in the thickness direction from a principal surface opposite to the first principal surface, out of the principal surfaces of the retaining seal material.

The details of these regions will be described below with reference to the drawings.

Additionally, the particle diameter of the inorganic particles is measured by the following method.

The images of the surfaces of the inorganic fibers that are present in the above three regions are taken using a scanning electron microscope (SEM). On the taken images, objects observed in the shape of particles in the inorganic fiber surfaces in a concavo-convex state are recognized as the inorganic particles. The diameter of the objects observed in the shape of particles is measured as the particle diameter of the inorganic particles.

Additionally, the mean particle diameter of the inorganic particles is calculated by the following method.

Five inorganic fibers that are present in each of the above three regions are sampled, and the particle diameter of the inorganic particles is measured by the above method. By calculating the mean value (arithmetic mean value) of the obtained measurement values, the mean particle diameter of the inorganic particles in each region is calculated.

The details of the method for measuring the particle diameter of the inorganic particles will be described below with reference to the drawings.

In the retaining seal material according to an embodiment of the present invention, the mean particle diameter of the inorganic particles in the vicinity of the center in the thickness direction of the retaining seal material is smaller than both the mean particle diameter of the inorganic particles in the vicinity of the first principal surface and the mean particle diameter of the inorganic particles in the vicinity of the second principal surface.

In this case, a retaining seal material that is easily bent while securing a high frictional coefficient in both the first principal surface and second principal surface of the retaining seal material can be provided.

In the retaining seal material according to an embodiment of the present invention, the mean particle diameter of the inorganic particles in the vicinity of the center in the thickness direction of the retaining seal material is 0.005 μm to 0.1 μm.

Since the frictional force between the inorganic fibers that constitute the retaining seal material becomes too small if the mean particle diameter of the inorganic particles in the vicinity of the center in the thickness direction of the retaining seal material is less than 0.005 μm, the surface pressure of the retaining seal material does not easily become high.

On the other hand, since the retaining seal material easily becomes hard if the mean particle diameter of the inorganic particles in the vicinity of the center in the thickness direction of the retaining seal material exceeds 0.1 μm, the flexibility of the retaining seal material decreases easily.

In the retaining seal material according to an embodiment of the present invention, at least any one of the mean particle diameter of the inorganic particles in the vicinity of the first principal surface and the mean particle diameter of the inorganic particles in the vicinity of the second principal surface is 0.1 µm to 1 µm.

Since irregularities of the principal surface of the retaining seal material becomes too small if the mean particle diameter of the inorganic particles in the vicinity of the first principal surface or the vicinity of the second principal surface in the retaining seal material is less than 0.1 µm, the frictional coefficient of the principal surface of the retaining seal material does not easily become high.

On the other hand, since the retaining seal material easily becomes hard if the mean particle diameter of the inorganic particles in the vicinity of the first principal surface or the vicinity of the second principal surface in the retaining seal material exceeds 1 µm, the flexibility of the retaining seal material decreases easily.

The retaining seal material according to an embodiment of the present invention further contains an organic binder.

By making the organic binder adhere to the inorganic fibers, the entanglement structure between the inorganic fibers can be made firmer, and the bulkiness of the retaining seal material can be suppressed.

The retaining seal material according to an embodiment of the present invention includes one mat, and the one mat is a mat made of the inorganic fibers subjected to needle punching.

Additionally, the retaining seal material according to an embodiment of the present invention includes a plurality of mats, and at least one mat of the plurality of mats is a mat made of the inorganic fibers subjected to needle punching.

By performing the needle punching treatment, the fibers can be entangled, and the bulk of the retaining seal material can be moderately reduced. As a result, the working efficiency in canning can be increased, and the surface pressure of the retaining seal material can be made high due to the entanglement between the inorganic fibers.

An exhaust gas purifying apparatus according to an embodiment of the present invention is an exhaust gas purifying apparatus including an exhaust gas treatment body, a metal casing that houses the exhaust gas treatment body, and a retaining seal material that is disposed between the exhaust gas treatment body and the metal casing and retains the exhaust gas treatment body, and the retaining seal material is the retaining seal material of the embodiment of the present invention.

As described above, the retaining seal material of the embodiment of the present invention has the effect of improving the surface pressure of the retaining seal material and the effect of improving the frictional coefficient of the surface of the retaining seal material and has the effect of being easily bent. Therefore, an exhaust gas purifying apparatus in which the retaining seal material is wound around the exhaust gas treatment body with no winding creasing on the inner peripheral side (exhaust gas treatment body side) of the retaining seal material or cracking on the outer peripheral side (metal casing side) of the retaining seal material and the exhaust gas treatment body is retained with a high retaining force can be provided.

Additionally, in the exhaust gas purifying apparatus according to an embodiment of the present invention, a large-scale exhaust gas treatment body that could not be retained only by the retaining seal material of the related art can be retained.

The embodiments will now be described with reference to the accompanying drawings, wherein like reference numerals designate corresponding or identical elements throughout the various drawings.

First Embodiment

A first embodiment that is an embodiment of a retaining seal material and an exhaust gas purifying apparatus of the embodiment of the present invention will be described below.

FIG. 1 is a perspective view schematically showing an example of the retaining seal material related to the first embodiment of the invention. The retaining seal material 1 shown in FIG. 1 is a mat that has a predetermined length (hereinafter shown by arrow L in FIG. 1) in a longitudinal direction, a predetermined width (hereinafter shown by arrow W in FIG. 1), and a predetermined thickness (hereinafter shown by arrow T in FIG. 1), and has a substantially rectangular shape in plan view. Additionally, the retaining seal material includes a first principal surface 11, and a second principal surface 12 that is a principal surface opposite to the first principal surface 11.

In the retaining seal material 1 shown in FIG. 1, a convex portion 17 is formed at one end portion out of end portions of the retaining seal material 1 in the longitudinal direction, and a concave portion 18 is formed at the other end portion. The convex portion 17 and the concave portion 18 of the retaining seal material 1 have shapes that fit each other perfectly when the retaining seal material 1 is wound around an exhaust gas treatment body in order to assemble an exhaust gas purifying apparatus to be described below.

The retaining seal material 1 shown in FIG. 1 has the predetermined thickness T.

The direction of the thickness T of the retaining seal material 1 is a direction perpendicular to the first principal surface 11 and the second principal surface 12.

The retaining seal material related to the first embodiment of the invention has three regions of "vicinity of the first principal surface", "vicinity of the center in the thickness direction", and "vicinity of the second principal surface" that are regions obtained by cutting the retaining seal material so as to have the predetermined thickness.

In FIG. 1, the "vicinity of the first principal surface" means a region (a region shown by 14 in FIG. 1) cut in a region of 1 mm in the thickness direction from the first principal surface 11. $T_a$ in FIG. 1 represents a thickness in the vicinity of the first principal surface, and $T_a$=1 mm.

The "vicinity of the center in the thickness direction" means a region (a region shown by 15 in FIG. 1) obtained by cutting a region of 0.5 mm above and below a centerline, that is, a region of 1 mm in total when a line that cuts the retaining seal material so that the thickness thereof becomes half is defined as "the centerline (a line shown by 13 in FIG. 1) in the thickness direction". $T_b$ in FIG. 1 represents the thickness the vicinity of the center in the thickness direction, and $T_b$=1 mm.

The "vicinity of the second principal surface" means a region (a region shown by 16 in FIG. 1) cut in a region of 1 mm in the thickness direction from the second principal surface 12. $T_c$ in FIG. 1 represents a thickness in the vicinity of the second principal surface, and $T_c$=1 mm.

The retaining seal material related to the first embodiment of the invention contains inorganic fibers and inorganic particles. The inorganic particles adhere to the surfaces of the inorganic fibers.

The inorganic fibers are not particularly limited, and are desirably at least one type of inorganic fibers selected from a group consisting of alumina fibers, alumina silica fibers, silica fibers, biosoluble fibers, and glass fibers. The inorganic fibers may be changed according to characteristics required for the retaining seal material, such as heat resistance or wind erosion resistance.

Among these, low-crystallinity alumina inorganic fibers are desirable, and low-crystallinity alumina inorganic fibers of mullite composition are more desirable.

As the inorganic particles, alumina particles or silica particles are desirable. One type of particles or two types of particles may be contained as the inorganic particles in the retaining seal material.

The alumina particles adhere to the inorganic fibers as a so-called inorganic binder in the form of alumina sol. In addition, the inorganic binder is a water solution containing the inorganic particles.

As the inorganic binder is heated together with inorganic fibers and becomes alumina particles, the alumina particles firmly bond the inorganic fibers.

On the other hand, in a case where silica sol is used in order to make the silica particles adhere, it is preferable to use the cationic silica sol.

Additionally, in a case where the inorganic particles are the alumina particles, it is desirable to uses alumina particles in which the shape of secondary particles in the water solution (in the inorganic binder) is chain-like.

The alumina particles of which the shape is chain-like are alumina particles in which plate-like alumina primary particles (tens of nanometers) are lined in a dispersed state in water, and secondary particles (hundreds of nanometers), which are lined in three-dimensional branches and are aggregated, are formed.

If the chain-like alumina particles are used, the entanglement between the secondary particles is large, and the particles adhere to the surfaces of the inorganic fibers while the particles are joined together. Therefore, since the inorganic particles adhere uniformly and easily to the surfaces of the inorganic fibers, it is believed that the surface pressure of the retaining seal material is further improved.

Moreover, while the zeta potential of the alumina particles dispersed in the water solution has a positive charge, the alumina particles adhere firmly to the surfaces of the inorganic fibers in a case where the alumina fibers or glass fibers in which the inorganic fibers have a negative charge is used. As a result, similar to a sheeting method for making the inorganic particles adhere uniformly to the surfaces of the inorganic fibers while being agitated in slurry, the inorganic particles adhere uniformly to the surfaces of the inorganic fibers even in an impregnating method for impregnating an inorganic binder in which a small amount of and a low concentration of inorganic particles are dispersed in a mat.

Additionally, fibrous alumina secondary particles, linear alumina secondary particles having a columnar aspect ratio, or alumina secondary particles aggregated in a feather shape is also preferable.

In the retaining seal material related to the first embodiment of the invention, the mean particle diameters of the inorganic particles in the vicinity of the first principal surface, the vicinity of the second principal surface, and the vicinity of the center in the thickness direction are different.

Specifically, the mean particle diameter of the inorganic particles in the vicinity of the center in the thickness direction is smaller than both the mean particle diameter of the inorganic particles in the vicinity of the first principal surface and the mean particle diameter of the inorganic particles in the vicinity of the second principal surface.

The mean particle diameter of the inorganic particles in the vicinity of the second principal surface may be the same as or different from the mean particle diameter of the inorganic particles in the vicinity of the first principal surface.

This will be described in detail below with reference to the drawings.

Figure 2A:
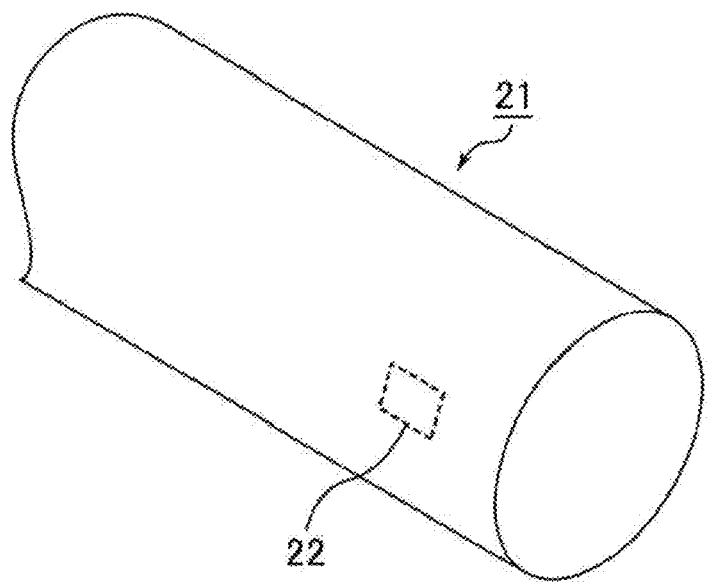
FIG. 2A is a perspective view schematically showing an inorganic fiber that is present in the retaining seal material.
Figure 2B:
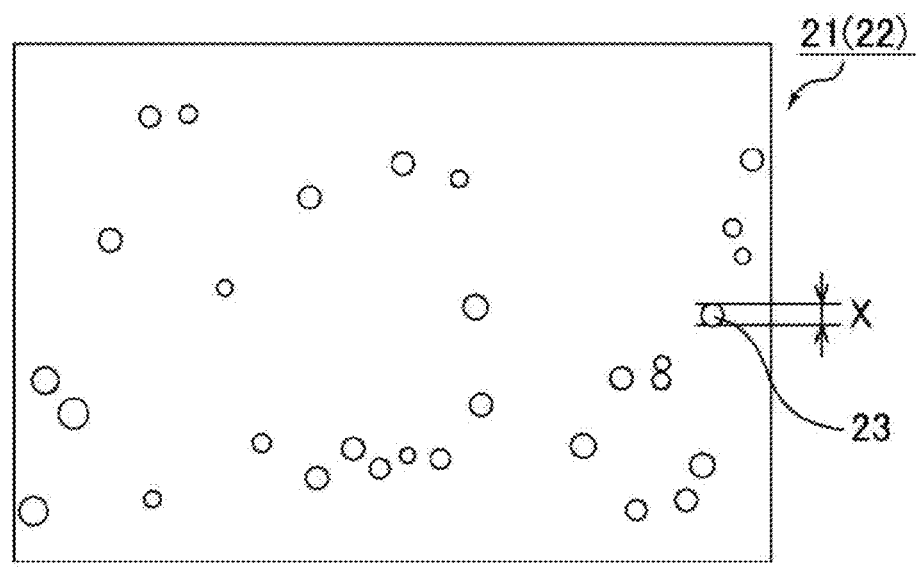
FIG. 2B is a view schematically showing a portion of an inorganic fiber surface in an enlarged manner.

FIG. 2A is a perspective view schematically showing an inorganic fiber that is present in the retaining seal material. FIG. 2B is a view schematically showing a portion of an inorganic fiber surface in an enlarged manner.

FIG. 2B is an enlarged view of a portion 22 of the inorganic fiber surface of an inorganic fiber 21 shown in FIG. 2A, which is surrounded by a broken line. As shown in FIG. 2B, inorganic particles 23 adhere to the surface of the inorganic fiber 21. The particle diameter of the inorganic particles 23 is a size expressed by X in FIG. 2B.

The mean particle diameter of the inorganic particles is calculated by the following method.

Five inorganic fibers 21 that are present the vicinity of the first principal surface of the retaining seal material are sampled, and images of the surfaces of the inorganic fibers are taken using a scanning electron microscope (SEM). On the taken images, objects observed in the shape of particles in a portion 22 of an inorganic fiber surface in a concavo-convex state are recognized as the inorganic particles 23. The diameter of the objects observed in the shape of particles is measured as a particle diameter X of the inorganic particles 23. Measurement of the particle diameter X of the inorganic particles 23 is performed to 30 arbitrary inorganic particles in a range where the area of the inorganic fiber surface per one inorganic fiber becomes 1.1 $\mu m^2$ in total. This working is performed to the five inorganic fibers. By calculating the mean value (arithmetic mean value) of the particle diameter X of all the inorganic particles 23 measured by the above method, the mean particle diameter of the inorganic particles in the vicinity of the first principal surface is calculated. In addition, only 30 inorganic particles of which the particle diameter is to be measured are shown in FIG. 2B.

The mean particle diameter of the inorganic particles in the vicinity of the second principal surface of the retaining seal material, and the mean particle diameter of the inorganic particles in the vicinity of the center in the thickness direction are also calculated by the same method as the above.

The mean particle diameter of the inorganic particles in the vicinity of the center in the thickness direction of the retaining seal material related to the first embodiment of the invention is desirably 0.005 $\mu m$ to 0.1 $\mu m$, and more desirably 0.01 $\mu m$ to 0.08 $\mu m$.

Since the frictional force between the inorganic fibers that constitute the retaining seal material becomes too small if the mean particle diameter of the inorganic particles in the vicinity of the center in the thickness direction of the retaining seal material is less than 0.005 $\mu m$, the surface pressure of the retaining seal material may not easily become high.

On the other hand, since the retaining seal material easily becomes hard if the mean particle diameter of the inorganic particles in the vicinity of the center in the thickness direction of the retaining seal material exceeds 0.1 $\mu m$, the flexibility of the retaining seal material may decrease easily.

The mean particle diameters of the inorganic particles in the vicinity of the first principal surface and the vicinity of the second principal surface in the retaining seal material related to the first embodiment of the invention are desirably 0.1 $\mu m$ to 1 $\mu m$, and more desirably 0.12 $\mu m$ to 0.8 $\mu m$.

Since irregularities of the principal surface of the retaining seal material becomes too small if the mean particle diameter of the inorganic particles in the vicinity of the first principal surface or the vicinity of the second principal surface in the retaining seal material is less than 0.1 $\mu m$, the frictional coefficient of the principal surface of the retaining seal material may not easily become high.

On the other hand, since the retaining seal material easily becomes hard if the mean particle diameter of the inorganic particles in the vicinity of the first principal surface or the vicinity of the second principal surface in the retaining seal material exceeds 1 µm, the flexibility of the retaining seal material may decrease easily.

As will be described below, the retaining seal material related to the first embodiment of the invention is preferably used as a retaining seal material that constitutes an exhaust gas purifying apparatus. In that case, the retaining seal material is more preferably arranged so that the first principal surface becomes a metal casing side and the second principal surface becomes an exhaust gas treatment body side.

In the case where the retaining seal material is arranged so that the first principal surface becomes the metal casing side and the second principal surface becomes the exhaust gas treatment body side, the mean particle diameter of the inorganic particles in the vicinity of the first principal surface of the retaining seal material is desirably 0.15 µm to 1.0 µm. Additionally, the mean particle diameter of the inorganic particles in the vicinity of the second principal surface of the retaining seal material is desirably 0.1 µm to 0.8 µm.

In addition, in the case where the retaining seal material is arranged so that the first principal surface becomes the metal casing side and the second principal surface becomes the exhaust gas treatment body side, the mean particle diameter of the inorganic particles in the vicinity of the first principal surface of the retaining seal material is preferably larger than the mean particle diameter of the inorganic particles in the vicinity of the second principal surface of the retaining seal material.

In the retaining seal material related to the first embodiment of the invention, the adhesion amount of the inorganic particles per inorganic fiber unit weight is desirably 0.2% by weight to 5% by weight on a solid content basis, and more desirably 0.5% by weight to 3% by weight.

In the retaining seal material related to the first embodiment of the invention, the types of the inorganic particles in the vicinity of the second principal surface of the retaining seal material, the vicinity of the center in the thickness direction of the retaining seal material, and the vicinity of the first principal surface of the retaining seal material may be the same as or different from each other in the respective regions.

An organic binder is desirably contained in the retaining seal material related to the first embodiment of the invention. The inorganic fibers that constitute the retaining seal material can be anchored to each other by the organic binder.

Emulsion in which acrylic latex, rubber-based latex, or the like is dispersed in water can be used as the organic binder.

In the retaining seal material related to the first embodiment of the invention, the adhesion amount of the organic binder per inorganic fiber unit weight is desirably 0.2% by weight to 12% by weight on a solid content basis, and more desirably 0.5% by weight to 6% by weight.

Needle punching for forming the entanglement between the inorganic fibers is desirably performed to the retaining seal material related to the first embodiment of the invention.

By performing the needle punching, the fibers can be entangled, and the bulk of the retaining seal material can be moderately reduced. As a result, the working efficiency in canning can be increased, and the surface pressure of the retaining seal material can be made high due to the entanglement between the inorganic fibers.

The needle punching means removing and inserting fiber entangling means, such as a needle, from or into a sheet-like object of inorganic fiber precursors. In the retaining seal material 1 shown in FIG. 1, the inorganic fibers with comparatively long mean fiber length are three-dimensionally entangled by the needle punching. That is, the retaining seal material 1 shown in FIG. 1 is subjected to the needle punching in the width direction perpendicular to the longitudinal direction, and the inorganic fibers are entangled. The inorganic fiber precursors will be described in a method for manufacturing a retaining seal material to be described below.

By virtue of this needle punching, the bulk of the retaining seal material can be moderately reduced, the working efficiency in canning can be increased, and the surface pressure of the retaining seal material can be made high due to the entanglement between the inorganic fibers.

In addition, the mean fiber length of the inorganic fibers requires a certain degree of length in order to assume entanglement structure. For example, the mean fiber length of the inorganic fibers is desirably 50 µm to 100 mm. Additionally, the mean diameter of the inorganic fibers is desirably 2 µm to 10 µm.

Next, an example of a method for manufacturing a retaining seal material related to the first embodiment of the invention will be described.

A method for manufacturing a retaining seal material related to a first embodiment of the invention includes: a mat preparing step of preparing a mat for a retaining seal material made of inorganic fibers subjected to needle punching; an impregnating step of bringing the mat into contact with an inorganic binder containing inorganic particles, and impregnating the inorganic binder in the mat; a dewatering step of dewatering the mat to which the inorganic binder has adhered; a drying step of drying moisture adhering to the mat; and an adhesion step of further making inorganic particles adhere to the surface of the mat of which the moisture has been dried.

In the above manufacturing method, the retaining seal material related to the first embodiment of the invention can be manufactured by changing the particle diameter of the inorganic particles in the impregnating step and the adhesion step.

(a) Mat Preparing Step

First, a mat preparing step of preparing a mat for a retaining seal material made of inorganic fibers subjected to needle punching is performed.

Although the mat that constitutes the retaining seal material related to the first embodiment of the invention can be obtained by various methods, the mat can be manufactured by, for example, the following method. That is, first, inorganic fiber precursors having a mean fiber diameter of 3 µm to 10 µm are made, for example, by spinning a mixture for spinning having a basic aluminum chloride water solution, silica sol, or the like as a raw material by a blowing method. Subsequently, preparation of the mat for a retaining seal material is completed by compressing the above inorganic fiber precursors to make a continuous sheet-like object with a predetermined size, performing the needle punching to this sheet-like object, and then, performing baking treatment.

(b) Impregnating Step

An impregnating step of bringing the mat into contact with an inorganic binder containing inorganic particles, and impregnating the inorganic binder in the mat is performed.

In the impregnating step, a method for bringing the mat into contact with the inorganic binder containing inorganic particles is not particularly limited. For example, the inorganic binder may be impregnated in the mat by immersing the mat in the inorganic binder containing inorganic particles, or the inorganic binder may be impregnated in the mat impregnate by dropping on the mat the inorganic binder containing inorganic particles by methods, such as a curtain coating method.

Although the particle diameter of the inorganic particles to be used the impregnating step is not particularly limited, the mean particle diameter of the inorganic particles in the vicinity of the center in the thickness direction of the retaining seal material of the present embodiment is desirably adjusted so as to become 0.005 μm to 0.1 μm.

As the inorganic binder, for example, alumina sol, silica sol, a colloidal dispersion liquid of these, or the like can be used. However, since the concentration may be too high in an undiluted solution that is commercially available, a diluted liquid in which the concentration of the inorganic particles becomes about 0.5% by weight to 5% by weight on a solid content basis is desirably used as the inorganic binder.

Additionally, in a case where the alumina sol is used as the inorganic binder, alumina sol (for example, AS550 made by Nissan Chemical Industries, Ltd.) containing alumina particles in which the shape of secondary particles in a water solution (in the inorganic binder) is chain-like is desirably used.

If the chain-like alumina particles are used, the entanglement between the secondary particles is large, and the particles adhere to the surfaces of the inorganic fibers while the particles are joined together. Therefore, since the inorganic particles adhere uniformly and easily to the surfaces of the inorganic fibers, it is believed that the surface pressure of the retaining seal material is further improved.

(c) Dewatering Step

Next, the mat to which the inorganic binder has adhered is subjected to dewatering process.

In this step, the adhesion amount of the inorganic binder can be roughly adjusted by suctioning and dewatering the mat on which the inorganic binder has adhered.

(d) Drying Step

Thereafter, a drying step of drying the mat to which the inorganic binder has adhered at a temperature of about 110 to 140° C. is performed, and moisture is evaporated to obtain the mat to which the inorganic particles have adhered.

Heating and hot-air drying can be used as a drying method.

(e) Adhesion Step

Next, an adhesion step of further making inorganic particles adhere to the first principal surface and second principal surface of the mat to which the inorganic particles have adhered is performed.

In the adhesion step, a method for making inorganic particles adhere to the first principal surface and second principal surface of the mat is not particularly limited. For example, the attachment method includes a spray coating method for spraying and blowing the inorganic binder containing inorganic particles from the first principal surface side and second principal surface side of the mat. In addition to this, there is a roll coating method, a film transfer method, a dip coating method, or the like.

By adjusting the particle diameter of the inorganic particles to be used for the adhesion step, the mean particle diameters of the inorganic particles in the vicinity of the first principal surface and the vicinity of the second principal surface in the retaining seal material of the present embodiment are desirably adjusted so as to become 0.1 μm to 1 μm.

In addition, the particle diameter of the inorganic particles made to adhere to the first principal surface of the mat may be the same as or different from the particle diameter of the inorganic particles made to adhere to the second principal surface.

By providing a difference between the particle diameter of the inorganic particles made to adhere to the first principal surface of the mat and the particle diameter of the inorganic particles made to adhere to the second principal surface, a difference can be provided between the mean particle diameter of the inorganic particles in the vicinity of the first principal surface of the retaining seal material and the mean particle diameter of the inorganic particles in the vicinity of the second principal surface.

As the inorganic binder, for example, alumina sol, silica sol, a colloidal dispersion liquid of these, or the like can be used. However, since the concentration may be too high in an undiluted solution that is commercially available, a diluted liquid in which so that the concentration of the inorganic particles becomes about 0.5% by weight to 5% by weight on a solid content basis is desirably used as the inorganic binder.

Additionally, in a case where the alumina sol is used as the inorganic binder, alumina sol (for example, AS550 made by Nissan Chemical Industries, Ltd.) containing alumina particles in which the shape of secondary particles in a water solution (in the inorganic binder) is chain-like is desirably used.

The type of the inorganic particles to be used for the adhesion step may be the same as or different from the type of the inorganic particles to be used for the impregnating step. Moreover, the type of the inorganic particles made to adhere to the first principal surface of the mat and the type of the inorganic particles made to adhere to the second principal surface of the mat may be the same as or different from each other.

The mat that has undergone the steps up to this step becomes the retaining seal material related to the first embodiment of the invention. Additionally, in order to obtain the retaining seal material of a shape including the convex portion and the concave portion as shown in FIG. 1, a cutting step of cutting the retaining seal material into a predetermined shape may be further performed.

A step of making an organic binder adhere to the inorganic fibers may be included in the method for manufacturing a retaining seal material related to the first embodiment of the invention.

Although the method and the procedure of making the organic binder adhere to the inorganic fibers are not particularly limited, for example, there is a spray coating method for spraying and blowing the inorganic binder from the first principal surface side and second principal surface side of the mat after the dewatering step (c).

Thereafter, the (d) drying step for drying moisture contained in the inorganic binder and the organic binder may be performed.

(Exhaust Gas Purifying Apparatus)

The retaining seal material related to the first embodiment of the invention is used as a retaining seal material of an exhaust gas purifying apparatus.

The exhaust gas purifying apparatus related to the first embodiment of the invention will be described below.

FIG. 3 is a cross-sectional view schematically showing an example of the exhaust gas purifying apparatus related to the first embodiment of the invention.

An exhaust gas purifying apparatus 100 shown in FIG. 3 includes a metal casing 120, an exhaust gas treatment body 130 that is housed in the metal casing 120, and the retaining seal material 1 that is disposed between the exhaust gas treatment body 130 and the metal casing 120.

The exhaust gas treatment body 130 is a columnar exhaust gas treatment body in which a number of cells 131 are provided side by side in the longitudinal direction with cell walls 132 therebetween. In addition, an introduction pipe that allows the exhaust gas to be discharged from an internal combustion engine to be introduced therethrough, and an exhaust pipe that allows the exhaust gas to pass through the exhaust gas purifying apparatus to be exhausted to the outside therethrough are connected to end portions of the metal casing 120 if needed.

In addition, in the exhaust gas purifying apparatus 100 shown in FIG. 3, an exhaust gas filter (honeycomb filter) in which any one end face of each cell is sealed by a sealing agent 133 is used as the exhaust gas treatment body 130. However, a catalyst carrier in which any end faces are not sealed by sealing agents may be used.

In the exhaust gas purifying apparatus 100 shown in FIG. 3, the retaining seal material 1 shown in FIG. 1 is used as a retaining seal material.

The retaining seal material 1 is preferably arranged so that the first principal surface 11 becomes a metal casing side and the second principal surface 12 becomes an exhaust gas treatment body side.

In a case where the mean particle diameter of the inorganic particles in the vicinity of the first principal surface of the retaining seal material is larger than the mean particle diameter of the inorganic particles in the vicinity of the second principal surface of the retaining seal material, the vicinity of the second principal surface of the retaining seal material is soft and is easily bent compared to the vicinity of the first principal surface. Therefore, the second principal surface of the retaining seal material is easily arranged on the exhaust gas treatment body side that bends at a steep angle by arranging the retaining seal material so that the first principal surface becomes the metal casing side and the second principal surface becomes the exhaust gas treatment body side.

Additionally, in a case where the mean particle diameter of the inorganic particles in the vicinity of the first principal surface of the retaining seal material is larger than the mean particle diameter of the inorganic particles in the vicinity of the second principal surface of the retaining seal material, surface irregularities, that is, surface roughness, in the first principal surface of the retaining seal material is larger than that in the second principal surface. Here, the surface roughness of the metal casing is smaller than the surface roughness of the surface of the exhaust gas treatment body. Therefore, it is believed that the frictional force between the first principal surface of the retaining seal material and the metal casing is improved as the retaining seal material is arranged so that the first principal surface becomes the metal casing side and the second principal surface becomes the exhaust gas treatment body side. As a result, the exhaust gas treatment body around which the retaining seal material is wound does not easily come off from metal casing.

A case where an exhaust gas passes through the exhaust gas purifying apparatus 100 having the above-described configuration will be described below with reference to FIG. 3.

As shown in FIG. 3, the exhaust gas (the exhaust gas is shown by G in FIG. 3, and the flow of then exhaust gas is shown by an arrow), which has been exhausted from an internal combustion engine and has flowed into the exhaust gas purifying apparatus 100, flows into one cell 131 of 1 that opens to an exhaust gas inflow-side end face 130a of the exhaust gas treatment body (honeycomb filter) 130, and passes through the cell walls 132 that separate the cells 131. In this case, the PM in the exhaust gas is trapped by the cell walls 132, and the exhaust gas is purified. The purified exhaust gas flows out of other cells 131 that open to an exhaust gas outflow-side end face 130b, and is exhausted to the outside.

Next, the exhaust gas treatment body (honeycomb filter) and the metal casing that constitute the exhaust gas purifying apparatus related to the first embodiment of the invention will be described.

In addition, since the configuration of the retaining seal material that constitutes the exhaust gas purifying apparatus has already been described as the retaining seal material related to the first embodiment of the invention, the description thereof is omitted.

First, the exhaust gas treatment body that constitutes the exhaust gas purifying apparatus will be described.

Figure 4:
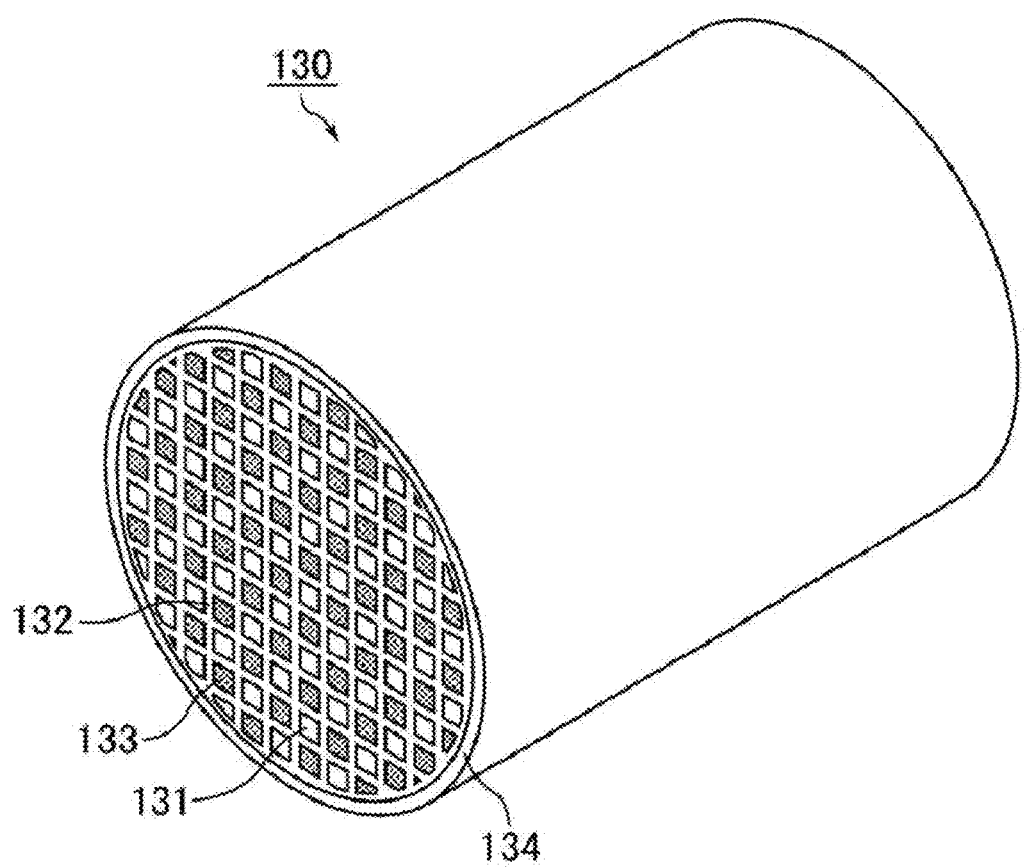
FIG. 4 is a perspective view schematically showing an example of an exhaust gas treatment body that constitutes the exhaust gas purifying apparatus related to the first embodiment of the invention.

FIG. 4 is a perspective view schematically showing an example of the exhaust gas treatment body that constitutes the exhaust gas purifying apparatus related to the first embodiment of the invention.

As shown in FIG. 4, the exhaust gas treatment body (honeycomb filter) 130 is made mainly of porous ceramics, and the shape thereof is substantially columnar. Additionally, an outer peripheral coating layer 134 is provided at an outer periphery of the honeycomb filter 130 in order to reinforce an outer peripheral portion of the honeycomb filter 130, arrange shape, or improve the heat-insulating properties of the honeycomb filter 130.

In addition, the internal configuration of the honeycomb filter 130 is as already described in the description of the exhaust gas purifying apparatus related to the first embodiment of the invention described above (refer to FIG. 3).

Next, the metal casing that constitutes the exhaust gas purifying apparatus will be described.

Figure 5:
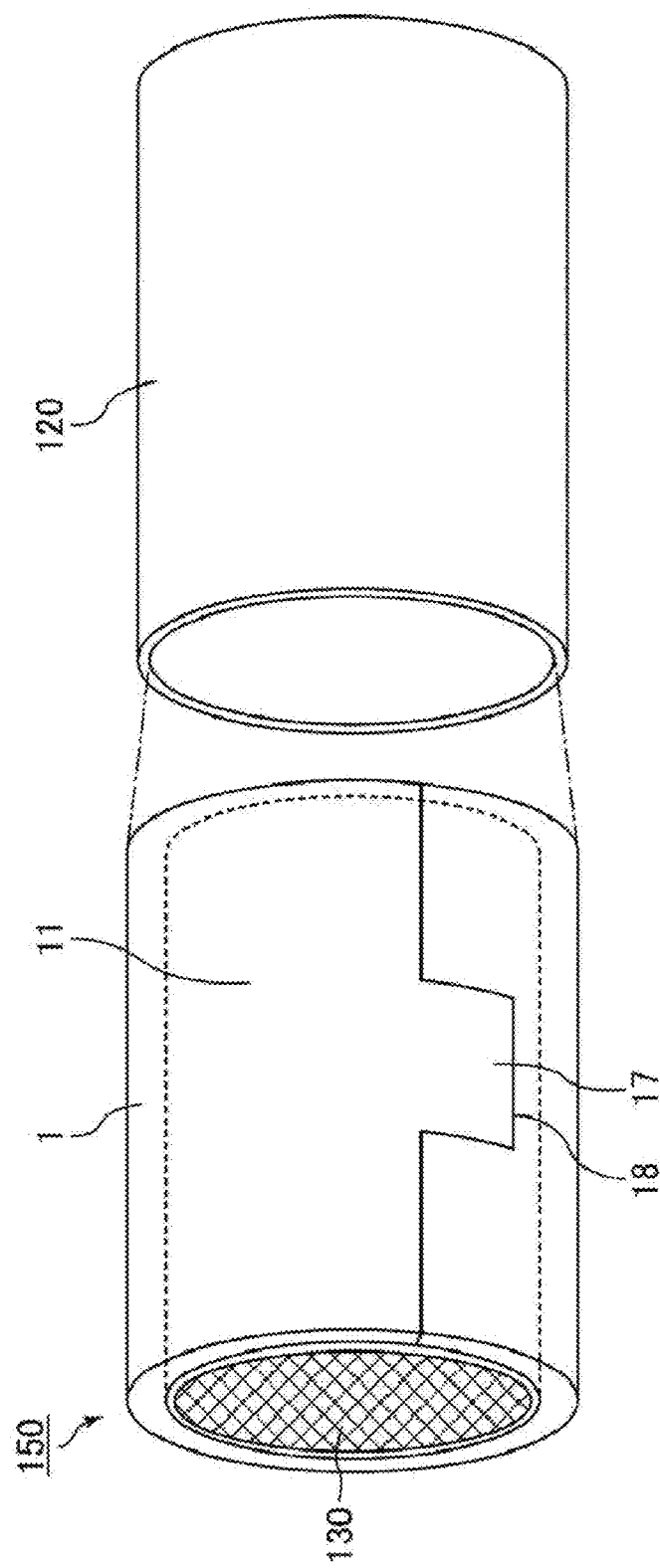
FIG. 5 is a perspective view schematically showing an example of a method for manufacturing an exhaust gas purifying apparatus related to the first embodiment of the invention.

The metal casing 120 is made mainly of metals, such as stainless steel, and the shape thereof, as shown in FIG. 3, may be a substantially cylindrical shape in which the internal diameter of both ends is smaller than the internal diameter of a central portion, or as shown in FIG. 5, may be a substantially cylindrical shape with a constant internal diameter.

The internal diameter (the internal diameter of a portion that houses the exhaust gas treatment body) of the metal casing is preferably slightly larger than the total length of the diameter of the end faces of the exhaust gas treatment body and the thickness of the retaining seal material in the state of being wound around the exhaust gas treatment body.

Subsequently, a method for manufacturing an exhaust gas purifying apparatus related to the first embodiment of the invention.

FIG. 5 is a perspective view schematically showing an example of the method for manufacturing an exhaust gas purifying apparatus related to the first embodiment of the invention. FIG. 5 shows an example using a substantially cylindrical metal casing with a constant internal diameter.

First, a winding step of winding the retaining seal material 1 shown in FIG. 1 around the exhaust gas treatment body (honeycomb filter) 130 to thereby make a winding body 150 (exhaust gas treatment body around which the retaining seal material is wound) by is performed.

In the winding step, the retaining seal material 1 is wound around the outer periphery of the substantially columnar exhaust gas treatment body 130 made by a well-known method of the related art so that the convex portion 17 and the concave portion 18 fit to each other.

As a result, the winding body 150 that is the exhaust gas treatment body 130 around which the retaining seal material 1 is wound can be made.

Next, a housing step of housing the made winding body 150 in the metal casing 120 that has a substantially cylindrical shape with a predetermined size and is made mainly of metal or the like is performed.

In order for the retaining seal material to be compressed after the housing and exhibit a predetermined repulsive force (that is, a force that retains the exhaust gas treatment body), the internal diameter of the metal casing 120 is slightly smaller than an outermost diameter including the thickness of the retaining seal material 1 of the exhaust gas treatment body 130 around which the retaining seal material 1 is wound.

The exhaust gas purifying apparatus 100 shown in FIG. 3 can be manufactured by the above method.

Examples of a method for housing the winding body in the metal casing regarding the housing step include a press-fitting method for press-fitting the winding body up to a predetermined position inside the metal casing (stuffing method), a sizing method for compressing the winding body from the outer peripheral side in order to reduce the internal diameter of the metal casing after the winding body is inserted into the metal casing (swaging method), and a clamshell method for making the metal casing into a shape that is separable into two parts of a first metal casing and a second metal casing, placing the winding body on the first metal casing, and then putting the second metal casing on the placed winding body to perform sealing.

The working effects of the retaining seal material and the exhaust gas purifying apparatus related to the first embodiment of the invention will be described below.

(1) In the retaining seal material of the present embodiment, the mean particle diameter of the inorganic particles in the vicinity of the center in the thickness direction of the retaining seal material is smaller than both the mean particle diameter of the inorganic particles in the vicinity of the first principal surface and the mean particle diameter of the inorganic particles in the vicinity of the second principal surface.

First, in the retaining seal material of the present embodiment, the surface pressure of the retaining seal material can be improved because the inorganic particles adhere to the surfaces of the inorganic fibers.

(2) Additionally, in the retaining seal material of the present embodiment, the mean particle diameters of the inorganic particles in the vicinity of the first principal surface and the vicinity of the second principal surface in the retaining seal material are larger than the mean particle diameter of the inorganic particles in the vicinity of the center in the thickness direction of the retaining seal material. Thus, irregularities of the surface of the retaining seal material become large. Accordingly, the frictional coefficient of the surface of the retaining seal material becomes large.

(3) Additionally, in the retaining seal material of the present embodiment, the mean particle diameter of the inorganic particles in the vicinity of the center in the thickness direction of the retaining seal material is smaller than the mean particle diameters of the inorganic particles in the vicinity of the first principal surface and the vicinity of the second principal surface in the retaining seal material. Thus, the frictional force between the inorganic fibers in the vicinity of the center in the thickness direction of the retaining seal material becomes small. As a result, the inorganic fibers are not easily broken, and the flexibility of the retaining seal material is improved.

(4) By changing the mean particle diameter of the inorganic particles in the thickness direction of the retaining seal material in this way, a retaining seal material that has the effect of improving the surface pressure of the retaining seal material and the effect of improving the frictional coefficient of the surface of the retaining seal material and that is easily bent can be provided.

Particularly, in the retaining seal material of the present embodiment, a retaining seal material that is easily bent while securing a high frictional coefficient in both the first principal surface and second principal surface of the retaining seal material can be provided.

(5) The exhaust gas purifying apparatus of the present embodiment is an exhaust gas purifying apparatus including an exhaust gas treatment body, a metal casing that houses the exhaust gas treatment body, and a retaining seal material that is disposed between the exhaust gas treatment body and the metal casing and retains the exhaust gas treatment body, and the retaining seal material is the retaining seal material of the present embodiment.

If the retaining seal material of the present embodiment is used as the retaining seal material, an exhaust gas purifying apparatus in which the retaining seal material is wound around the exhaust gas treatment body with no winding creasing or cracking and the exhaust gas treatment body is retained with a high retaining force can be provided.

Additionally, in the exhaust gas purifying apparatus of the present embodiment, a large-scale exhaust gas treatment body that could not be retained only by the retaining seal material of the related art can be retained.

EXAMPLES

Examples in which the first embodiment of the invention is more specifically disclosed are shown below. In addition, the invention is not limited only to such examples.

Example 1

(a) Mat Preparing Step

First, a mat for a retaining seal material is prepared according to the following procedure.

(a-1) Spinning Step

Silica sol is compounded with a basic aluminum chloride water solution, which is prepared so that Al content is 70 g/l and Al:Cl=1:1.8 (atomic ratio) is established, so that a composition ratio in inorganic fibers after baking becomes $Al_2O_3$: $SiO_2$=72:28 (weight ratio), and a moderate amount of organic polymers (polyvinyl alcohol) is added to prepare a mixed solution.

The obtained mixed solution is condensed into a mixture for spinning, and this mixture for spinning is spinned by the blowing method to make inorganic fiber precursors of which the mean fiber diameter is 5.1 μm.

(a-2) Compressing Step

The inorganic fiber precursors obtained in the above step (a-1) is compressed to make a continuous sheet-like object.

(a-3) Needle Punching Step

Needle punching is continuously performed on the sheet-like object obtained in the above step (a-2), using the conditions shown below, to make a needle punched body.

First, a needle board to which needles are attached in a density of 21 pieces/cm$^2$ is prepared. Next, this needle board is disposed above one surface of the sheet-like object, and the needle board is moved up and down one time along the thickness direction of the sheet-like object to perform needle punching to make a needle punched body. In this case, the needles are made to penetrate until barbs formed at tip portions of the needles completely penetrate and protrude to the opposite surface of the sheet-like object.

(a-4) Baking Step

The needle punched body obtained in the above step (a-3) is continuously baked at a highest temperature of 1250° C. to make a baked sheet-like object made of inorganic fibers containing alumina and silica in a ratio of 72 parts by weight:28 parts by weight. The mean fiber diameter of the inorganic fibers is 5.1 μm, and the minimum value of the inorganic fiber diameter is 3.2 μm. The inorganic fibers obtained in this way have a bulk density 0.15 g/cm$^3$ and a basis weight of 1400 g/m$^2$.

(a-5) Cutting Step

The baked sheet-like object obtained in the above step (a-4) is cut to prepare a cut sheet-like object (mat).

(b) Impregnating Step

An inorganic binder containing inorganic particles of which the solid content concentration is 1% by weight by diluting alumina sol (alumina sol solution AS550 made by Nissan Chemical Industries, Ltd. (solid content concentration: 15% by weight, and particle diameter: 0.04 μm)) with water is adjusted. This inorganic binder is brought into contact with the mat by the curtain coating method, and the inorganic binder is impregnated in the mat.

(c) Dewatering Step

By suctioning and dewatering the mat to which the inorganic binder has adhered using a dewaterer, the inorganic binder is adjusted so that 100% by weight of inorganic binder has adhered to 100% by weight of inorganic fibers. Since the solid content concentration of the inorganic particles in the inorganic binder is 1% by weight, the adhesion amount of the inorganic particles per inorganic fiber unit weight becomes 1% by weight on a solid content basis.

(d) Drying Step

Next, the mat to which the inorganic particles have adhered is obtained by heating and hot-air drying the mat to which the inorganic binder has adhered at 130° C.

(e) Adhesion Step

An inorganic binder containing inorganic particles of which the solid content concentration is 1% by weight by diluting silica particles (Product Name MP-2040 made by Nissan Chemical Industries, Ltd., and particle diameter: 0.2 μm) with water is adjusted.

Spray coating is performed to the first principal surface and second principal surface of the mat, using this inorganic binder, so that the adhesion amount of the inorganic particles per unit weight of the inorganic fibers becomes 1% by weight on a solid content basis.

(f) Trimming

The manufacture of the retaining seal material is completed by trimming the mat obtained in this way so that the dimensions in plan view are 776 mm in total length×290 mm in width, a convex portion of which the length L is 40 mm and the width W is 100 mm is formed at one end, and a concave portion that fits to this convex portion is molded at the other end.

In addition, the thickness of the retaining seal material is 8.2 mm.

Example 2

The steps up to (a) mat preparing step, (b) impregnating step, and (c) dewatering step in the above-described Example 1 are performed similarly to Example 1.

Subsequently, an organic binder containing liquid of which the solid content concentration is 1% by weight is prepared by using latex (LX-874 made by Nippon Zeon Co., Ltd.) in which acrylic rubber is dispersed in water, and diluting the latex with water, and the organic binder containing liquid is spray-coated on the first principal surface and second principal surface of the mat so that the adhesion amount of the organic binder per unit weight of the inorganic fibers becomes 1% by weight on a solid content basis.

A retaining seal material is made by performing (d) drying step, (e) adhesion step, and (f) trimming, similarly to Example 1, to the obtained mat to which the inorganic binder and the organic binder have adhered.

Comparative Example 1

A retaining seal material is made similarly to Example 1 except that (e) adhesion step in the above-described Example 1 is not performed.

Comparative Example 2

A retaining seal material is made similarly to Example 1 except that (b) impregnating step in the above-described Example 1 is not performed.

Comparative Example 3

A retaining seal material is made similarly to Example 2 except that (b) impregnating step and (e) adhesion step in the above-described Example 2 is not performed.

The following evaluations are performed regarding the retaining seal materials made in the respective examples and the respective comparative examples.

(Measurement of Particle Diameter of Inorganic Particle)

The surfaces of the inorganic fibers, which are present in the respective regions the vicinity of the second principal surface of the retaining seal material the vicinity of the center in the thickness direction of the retaining seal material the vicinity of the first principal surface of the retaining seal material as described in the description of the retaining seal material of the first embodiment of the invention, are observed, and the particle diameter of the inorganic particles are measured.

Figure 6A:
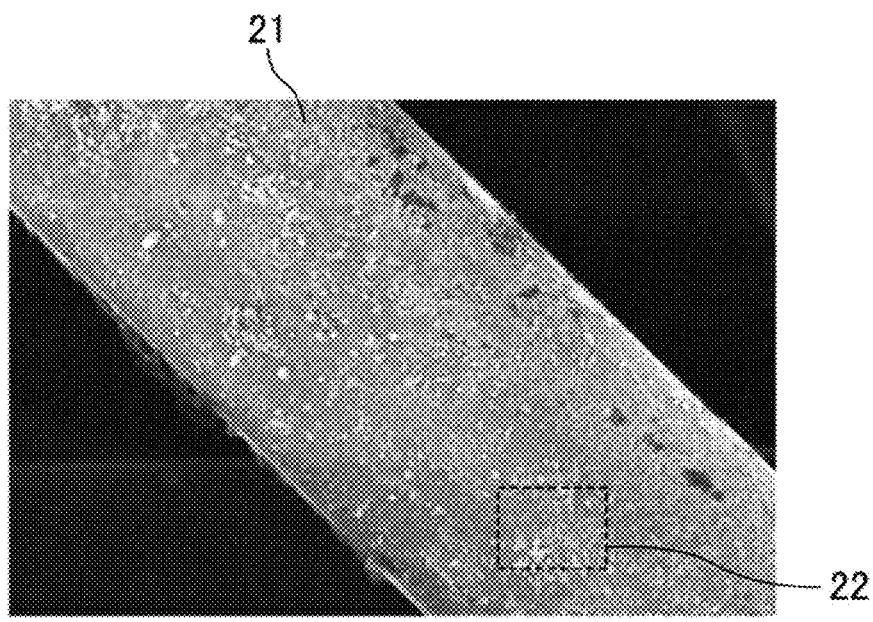
FIG. 6A shows an example of a photograph taken of a portion of the surface of an inorganic fiber that is present in the retaining seal material using a scanning electron microscope (SEM).

FIG. 6A shows an example of a photograph taken of a portion of the inorganic fiber surface that is present in the retaining seal material using a scanning electron microscope (SEM).

Figure 6B:
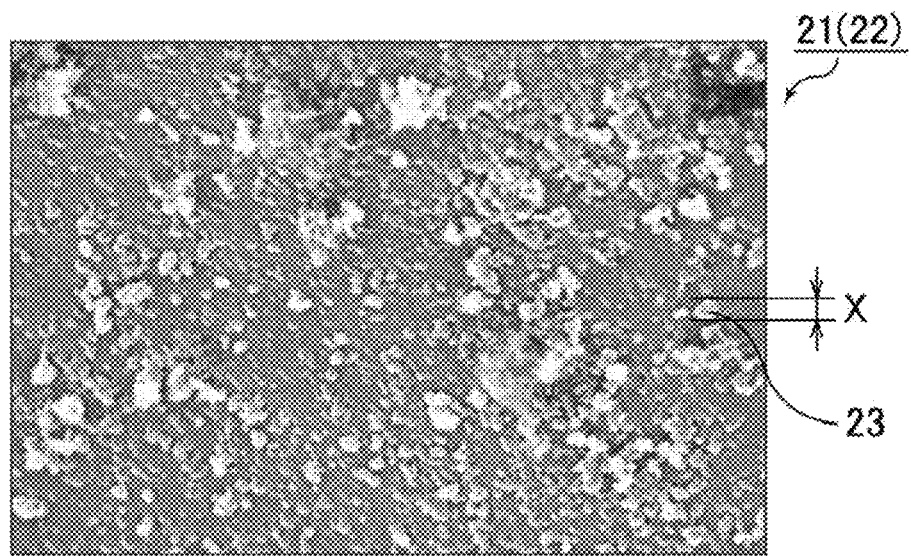
FIG. 6B shows an image of the inorganic fiber surface obtained by enlarging a portion of FIG. 6A.

FIG. 6B shows an image of the inorganic fiber surface obtained by enlarging a portion of FIG. 6A. FIG. 6B is an enlarged view of the portion 22 of the inorganic fiber surface of the inorganic fiber 21 shown in FIG. 6A, which is surrounded by a broken line. On the image shown in FIG. 6B, objects observed in the shape of particles in the portion 22 of the inorganic fiber surface in a concavo-convex state are recognized as the inorganic particles 23, and the particle diameter X of the inorganic particles 23 is measured. Next, on the image shown in FIG. 6B, similar measurement is also performed to respective objects observed in the shape of particles separate from the inorganic particle 23. Thereafter, measurement of the particle diameter X of the inorganic particles 23 is performed to 30 arbitrary inorganic particles in a range where the area of the inorganic fiber surface per one inorganic fiber becomes 1.1 $\mu m^2$ in total. In the respective regions, this working is performed to five inorganic fibers.

By calculating the mean value (arithmetic mean value) of the particle diameter X of all the inorganic particles in the respective regions measured by the above method, the mean particle diameter of the inorganic particles in the respective regions is calculated. The results are shown in the following Table 1.

(Surface Pressure Test)

Surface pressures are measured regarding the retaining seal materials obtained in the respective examples and the respective comparative examples, by the following method.

As a sample of which the surface pressure is to be measured, a sample obtained by cutting a retaining seal material into a size of 50 mm×50 mm is used.

In addition, a hot surface pressure measuring device including a heating heater in a portion of a plate that compresses a mat is used for the measurement of the surface pressure.

First, in a room-temperature state, the sample is compressed, the bulk density (GBD) thereof becomes 0.4 g/cm³, and is held for 10 minutes. In addition, the bulk density of the sample is a value determined by "bulk density=weight of sample/(area of sample X thickness of sample)".

Next, the bulk density is opened up to 0.273 g/cm³ while the temperature of one surface is raised to 650° C. or to 900° C. at 40° C./min, in a state where the sample is compressed. Then, the sample is held for 5 minutes in a state where the temperature of one surface is 900° C. or 650° C. and the bulk density is 0.273 g/cm³.

Thereafter, the sample is compressed until the bulk density becomes 0.3 g/cm³ at 1 inch (25.4 mm)/min, and the load at that time is measured. The surface pressure (kPa) is obtained by dividing the obtained load by the area of the sample. The results are shown in the following Table 1.

(Measurement of Frictional Coefficient)

Frictional coefficients are measured regarding the retaining seal materials obtained in the respective examples and the respective comparative examples by the following method.

Figure 7:
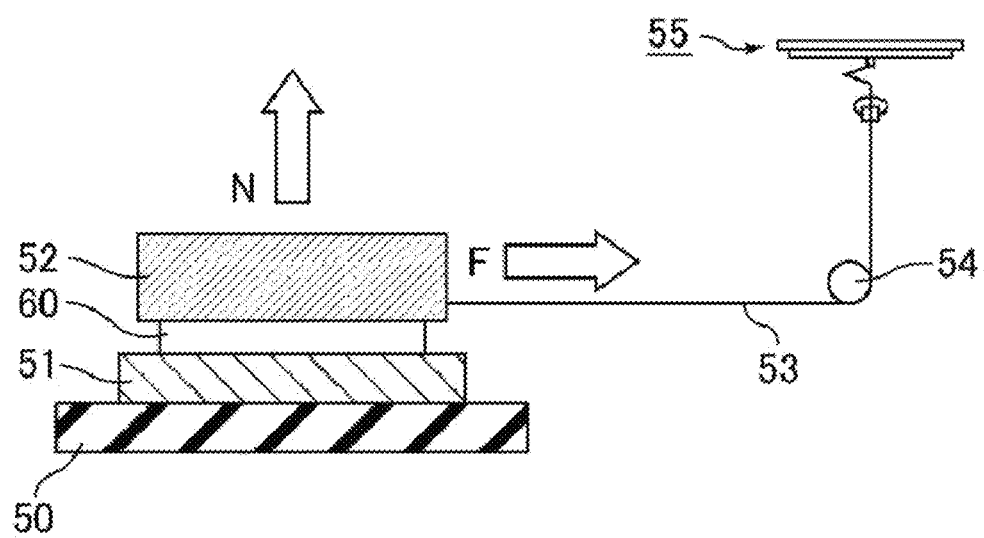
FIG. 7 is a side view schematically showing a frictional coefficient measuring device.

FIG. 7 is a side view schematically showing a frictional coefficient measuring device.

First, a made retaining seal material is trimmed into a total length of 30 mm X a width of 50 mm in plan view to obtain a sample 60 for measuring frictional coefficient. Next, a stainless plate 51, the sample 60 for measuring frictional coefficient, and weights 52 that weighs 5 kg each are placed in order on a hot plate 50 of ordinary temperature, and are held for 10 minutes in this state.

Thereafter, a wire 53 attached to the weights 52 are pulled at a velocity of 10 mm/min via a pulley 54 by a universal testing machine 55, and the peak load F thereof is measured. In addition, a projection is provided on the weight 52 so that deviation does not occur in at interface between the weight 52 and the sample 60 for measuring frictional coefficient, both the weight and the sample are fixed, and measurement is performed. The frictional coefficient μ is calculated according to the relational expression of "μ=F/N" from the obtained peak load F (N), and a perpendicular force N (N) that acts on a contact surface between the stainless plate 51 and the sample 60 for measuring frictional coefficient. The results are shown in the following Table 1.

(a) Making of Winding Body

A columnar exhaust gas treatment body, which is mainly made of porous ceramics and has a diameter of 90 mm and a total length of 120 mm, is prepared, and a columnar metal casing that is made of stainless steel and has a diameter of 98 mm and a total length of 150 mm, is prepared.

(b) Next, a winding body is made as being wound around the outer periphery of the prepared exhaust gas treatment body without gap so that the convex portion and concave portion of the end portions of the retaining seal material of each of the examples and the comparative examples fit to each other.

(c) Press-fitting of Winding Body into Metal Casing

An exhaust gas purifying apparatus using the retaining seal material of each of the examples and the comparative examples is produced by press-fitting the winding body up to a predetermined position inside the metal casing.

(d) Measurement of Punching Load

As for the respective exhaust gas purifying apparatuses according to the above procedure, measurement of punching loads are performed by the following method.

Figure 8A:
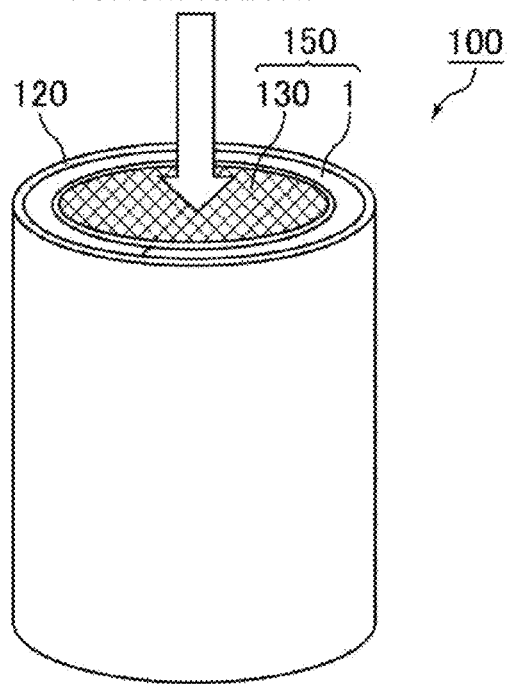
FIG. 8A is a perspective view schematically showing a procedure for punching load measurement.
Figure 8B:
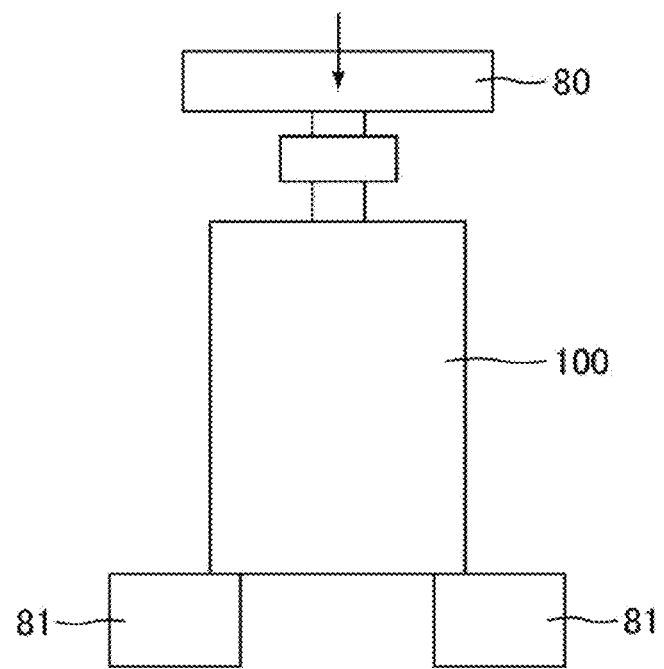
FIG. 8B is a front view schematically showing a punching load measuring machine.

FIG. 8A is a perspective view schematically showing a procedure for punching load measurement. FIG. 8B is a front view schematically showing a punching load measuring machine.

As shown in FIGS. 8A and 8B, after the exhaust gas purifying apparatus 100 is placed on a platform 81, a punching load (pressing speed: 1 mm/min) is applied to the exhaust gas treatment body 130 with a jig 80 made of aluminum with a diameter of 30 mm, the maximum of the punching load (N) until the winding body 150 (the exhaust gas treatment body 130 around which the retaining seal material 1 is wound) is punched from the metal casing 120 is measured, and the result is used as a punching load as a retaining force between the retaining seal material and the metal casing. In addition, an Instolon universal testing machine (Model 5582) is used for measurement of the punching load. The results are shown in the following Table 1.

The characteristics and evaluation results of the retaining seal materials of the respective examples and the respective comparative examples are collectively shown in Table 1.

TABLE 1

| | Adhesion Amount of Inorganic Particle (% by weight) | | | | Adhesion Amount of Organic Binder (% by weight) | Mean Particle Diameter of Inorganic Particle (μm) | | | Surface Pressure (kPa) | Frictional Coefficient μ | Punching Load (N/cm²) |
|---|---|---|---|---|---|---|---|---|---|---|---|
| | Impregnating Step Whole Mat | Adhesion Step | | Total Amount | | Vicinity of First Principal Surface | Vicinity of Center in Thickness Direction | Vicinity of Second Principal Surface | | | |
| | | First Principal Surface | Second Principal Surface | | | | | | | | |
| Example 1 | 1 | 1 | 1 | 3 | 0 | 0.18 | 0.03 | 0.19 | 570 | 0.30 | 4.7 |
| Example 2 | 1 | 1 | 1 | 3 | 1 | 0.18 | 0.03 | 0.19 | 530 | 0.28 | 4.3 |
| Comparative Example 1 | 1 | 0 | 0 | 1 | 0 | 0.04 | 0.04 | 0.04 | 570 | 0.23 | 3.7 |
| Comparative Example 2 | 0 | 1 | 1 | 2 | 0 | 0.19 | 0.00 | 0.20 | 450 | 0.30 | 3.8 |
| Comparative Example 3 | 0 | 0 | 0 | 0 | 1 | 0.00 | 0.00 | 0.00 | 420 | 0.21 | 3.3 |

(Measurement of Punching Load)

Exhaust gas purifying apparatuses are made according to the following procedure using the retaining seal materials obtained in the respective examples and the respective comparative examples, punching loads of the respective exhaust gas purifying apparatuses are measured.

In the retaining seal materials made in Example 1 and Example 2, a relationship is established in which the mean particle diameter of the inorganic particles in the vicinity of the center in the thickness direction of the retaining seal materials are smaller than both the mean particle diameters of the inorganic particles in the vicinity of the first principal surface and the vicinity of the second principal surface in the retaining seal materials. Additionally, the retaining seal materials, in which all of the surface pressures, the frictional coefficients, and the punching load become suitable values, and the retaining force of the exhaust gas treatment bodies is excellent, are provided.

Since the retaining seal material made in Comparative Example 1 does not undergo (e) adhesion step, the mean particle diameters of the inorganic particles of the retaining seal material are almost the same in the respective regions. That is, the particle diameters of the inorganic particles in the vicinity of the first principal surface and the vicinity of the second principal surface in the retaining seal material is not larger than the mean particle diameter of the inorganic particles in the vicinity of the center in the thickness direction of the retaining seal material. Therefore, irregularities of the surface of the retaining seal material are not large. As a result, the retaining seal material, in which the values of the frictional coefficient and the punching load are low and the retaining force of the exhaust gas treatment body is inferior, is provided.

Since the retaining seal material made in Comparative Example 2 does not undergo (b) impregnating step, the inorganic particles do not adhere to the inorganic fibers except for the vicinity of the first principal surface and the vicinity of the second principal surface in the retaining seal material. Therefore, the frictional force between the inorganic fibers in locations excluding the vicinity of the first principal surface and the vicinity of the second principal surface in the retaining seal material becomes small. As a result, the retaining seal material, in which the values of the surface pressure and the punching load are low and the retaining force of the exhaust gas treatment body is inferior, is provided.

Since the retaining seal material made in Comparative Example 3 does not undergo (b) impregnating step and (e) adhesion step, the inorganic particles do not adhere to the inorganic fibers. Therefore, the retaining seal material, in which the values of the surface pressure, the frictional coefficient, and the punching load are low and the retaining force of the exhaust gas treatment body is worst in the respective examples and the respective comparative examples, is provided.

Second Embodiment

A second embodiment that is an embodiment of a retaining seal material and an exhaust gas purifying apparatus of the invention will be described below.

The second embodiment of the invention is different from the first embodiment of the invention in that the retaining seal material includes three mats.

Figure 9:
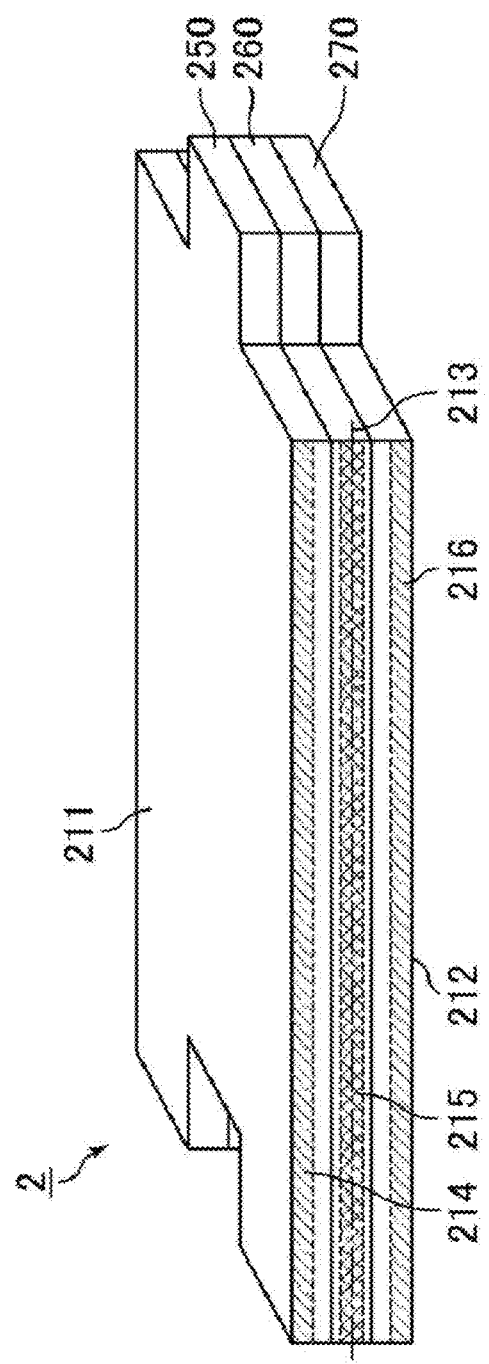
FIG. 9 is a perspective view schematically showing an example of a retaining seal material related to a second embodiment of the invention.

FIG. 9 is a perspective view schematically showing an example of the retaining seal material related to the second embodiment of the invention. The retaining seal material 2 shown in FIG. 9 is a mat that has a predetermined length in a longitudinal direction, a predetermined width, and a predetermined thickness, similarly to the retaining seal material 1 shown in FIG. 1, and has a substantially rectangular shape in plan view. Additionally, the retaining seal material 2 includes a first principal surface 211, and a second principal surface 212 that is a principal surface opposite to the first principal surface 211.

Moreover, in the retaining seal material 2, a first mat 250, a second mat 260, and a third mat 270 are laminated in order.

The first mat 250 is located on the first principal surface 211 side, and the third mat 270 is located on the second principal surface 212 side. The second mat 260 is located between the first mat 250 and the third mat 270.

The retaining seal material 2 shown in FIG. 9, similarly to the retaining seal material 1 shown in FIG. 1, has three regions of "vicinity 214 of the first principal surface", "vicinity 215 of the center in the thickness direction", and "vicinity 216 of the second principal surface" that are regions obtained by cutting the retaining seal material so as to have the predetermined thickness.

In addition, line 213 in FIG. 9 is a centerline in the thickness direction of the retaining seal material 2.

The retaining seal material related to the second embodiment of the invention contains inorganic fibers and inorganic particles. The inorganic particles adhere to the surfaces of the inorganic fibers.

In the retaining seal material related to the second embodiment of the invention, similarly to the retaining seal material related to the first embodiment of the invention, the mean particle diameters of the inorganic particles in the vicinity of the first principal surface, the vicinity of the second principal surface, and the vicinity of the center in the thickness direction are different.

Specifically, the mean particle diameter of the inorganic particles in the vicinity of the center in the thickness direction is smaller than both the mean particle diameter of the inorganic particles in the vicinity of the first principal surface and the mean particle diameter of the inorganic particles in the vicinity of the second principal surface.

The mean particle diameter of the inorganic particles in the vicinity of the second principal surface may be the same as or different from the mean particle diameter of the inorganic particles in the vicinity of the first principal surface.

The type of the inorganic fibers and the type of the inorganic particles are the same as those described in the first embodiment of the invention.

Additionally, since a method for calculating the mean particle diameters of the inorganic particles in the respective regions is the same as the method described in the first embodiment of the invention, the detailed description thereof is omitted.

The mean particle diameter of the inorganic particles in the vicinity of the center in the thickness direction of the retaining seal material related to the second embodiment of the invention is desirably 0.005 µm to 0.1 µm, and more desirably 0.01 µm to 0.8 µm.

The mean particle diameters of the inorganic particles in the vicinity of the first principal surface and the vicinity of the second principal surface in the retaining seal material related to the second embodiment of the invention are desirably 0.1 µm to 1 µm, and more desirably 0.12 µm to 0.8 µm.

In the retaining seal material 2 shown in FIG. 9, the mean particle diameters of the inorganic particles within the first mat 250, the second mat 260, and the third mat 270 may be uniform.

In this case, by making the mean particle diameter of the inorganic particles within the second mat 260 smaller than both the mean particle diameter of the inorganic particles within the first mat 250 and the mean particle diameter of the inorganic particles within the third mat 270, the mean particle diameter of the inorganic particles in the vicinity 215 of the center in the thickness direction can be made smaller than both the mean particle diameter of the inorganic particles in the vicinity 214 of the first principal surface and the mean particle diameter of the inorganic particles in the vicinity 216 of the second principal surface.

Similarly to the retaining seal material related to the first embodiment of the invention, the retaining seal material related to the second embodiment of the invention is preferably used as a retaining seal material that constitutes an exhaust gas purifying apparatus, and is more preferably arranged so that the first principal surface becomes a metal casing side and the second principal surface becomes an exhaust gas treatment body side.

In the case where the retaining seal material is arranged so that the first principal surface becomes the metal casing side and the second principal surface becomes the exhaust gas treatment body side, the desirable mean particle diameter of the inorganic particles in the vicinity of the first principal surface of the retaining seal material, and the desirable mean particle diameter of the inorganic particles in the vicinity of the second principal surface of the retaining seal material are as described in the first embodiment of the invention.

In the retaining seal material related to the second embodiment of the invention, the adhesion amount of the inorganic particles per inorganic fiber unit weight is desirably 0.2% by weight to 5% by weight on a solid content basis, and more desirably 0.5% by weight to 3% by weight.

In the retaining seal material related to the second embodiment of the invention, the types of the inorganic particles within the first mat 250, the second mat 260, and the third mat 270 may be the same as or different from each other in the respective mats.

Similarly to the retaining seal material related to the first embodiment of the invention, an organic binder is desirably contained in the retaining seal material related to the second embodiment of the invention.

The organic binder is as described in the first embodiment of the invention.

The first mat 250, the second mat 260, and the third mat 270 that constitute the retaining seal material 2 shown in FIG. 9 are desirably subjected to needle punching for forming the entanglement between the inorganic fibers, respectively.

The needle punching is as described in the first embodiment of the invention.

Next, a first manufacturing method that is an example of a method for manufacturing a retaining seal material related to the second embodiment of the invention will be described.

A first manufacturing method of a retaining seal material related to a second embodiment of the invention includes: a mat preparing step of preparing a first mat, a second mat, and a third mat for a retaining seal material made of inorganic fibers subjected to needle punching; an impregnating step of bringing the respective mats into contact with an inorganic binder containing inorganic particles, and impregnating the inorganic binder in the respective mats; a dewatering step of dewatering the respective mats to which the inorganic binder has adhered; a drying step of drying moisture adhering to the respective mats; and a laminating step of laminating the respective mats of which the moisture has been dried.

In the first manufacturing method, the particle diameter of the inorganic particles made to adhere to the respective mats is changed in the impregnating step. Thereby, since the mean particle diameters of the inorganic particles in the vicinity of the first principal surface, the vicinity of the second principal surface, and the vicinity of the center in the thickness direction can be changed, the retaining seal material related to the second embodiment of the invention can be manufactured.

(a) Mat Preparing Step

First, a mat preparing step of preparing a first mat, a second mat, and a third mat for a retaining seal material made of inorganic fibers subjected to needle punching is performed.

The respective mats can be manufactured by the same method as the method described in the first embodiment of the invention.

(b) Impregnating Step

An impregnating step of bringing the respective mats into contact with an inorganic binder containing inorganic particles, and impregnating the inorganic binder in the respective mats is performed.

As for the particle diameters of the inorganic particles to be used for the impregnating step, the particle diameter of the inorganic particles impregnated in the second mat where the vicinity of the center in the thickness direction of the retaining seal material is located may be adjusted so as to become smaller than the particle diameters of the inorganic particles in the first mat where the vicinity of the first principal surface of the retaining seal material is located and the third mat where the vicinity of the second principal surface is located, and the particle diameters of the inorganic particles impregnated in the respective mats are not particularly limited.

In addition, by adjusting the particle diameter of the inorganic particles impregnated in the second mat, the mean particle diameter of the inorganic particles in the vicinity of the center in the thickness direction of the retaining seal material of the present embodiment is desirably adjusted so as to become 0.005 µm to 0.1 µm.

Additionally, by adjusting the particle diameters of the inorganic particles impregnated in the first mat and the third mat, the mean particle diameters in the vicinity of the first principal surface and the vicinity of the second principal surface in the retaining seal material of the present embodiment is desirably adjusted so as to become 0.1 µm to 1 µm.

In addition, the particle diameter of the inorganic particles impregnated in the first mat may be the same as or different from the particle diameter of the inorganic particles impregnated in the third mat.

Additionally, the type of the inorganic particles impregnated in the first mat, the type of the inorganic particles impregnated in the second mat, and the type of the inorganic particles impregnated in the third mat may be the same as or different from each other.

Other conditions or the like in the impregnating step are as described in the first embodiment of the invention.

(c) Dewatering Step

Next, the respective mats to which the inorganic binder has adhered are subjected to dewatering process.

(d) Drying Step

Thereafter, a drying step of drying the respective mats to which the inorganic binder has adhered at a temperature of about 110° C. to 140° C. is performed, and moisture is evaporated to obtain the mats to which the inorganic particles have adhered.

(e) Laminating Step

The first mat, the second mat, and the third mat are laminated in order and integrated to make a laminated body.

The integration method is not particularly limited, and includes methods, such as yarn sewing, joining by an adhesive tape, or adhesion by an adhesive.

The mats that have undergone the steps up to this step become the retaining seal material related to the second embodiment of the invention.

Additionally, in order to obtain the retaining seal material of a shape including the convex portion and the concave portion as shown in FIG. 9, a cutting step of cutting the retaining seal material into a predetermined shape may be further performed.

In the first manufacturing method, the vicinity of the first principal surface of the retaining seal material is located in the first mat, the vicinity of the center in the thickness direction of the retaining seal material is located in the second mat, and the vicinity of the second principal surface of the retaining seal material is located in the third mat. Accordingly, although the thicknesses of the respective mats are desirably equal to or more than 1 mm, respectively, the thicknesses particularly of the respective mats are not limited.

Next, a second manufacturing method that is another example of a method for manufacturing a retaining seal material related to the second embodiment of the invention will be described.

The second manufacturing method is the same as the first manufacturing method in impregnated in the mat preparing step, the impregnating step, the dewatering step, the drying step, and the laminating step are performed. On the other hand, the second manufacturing method is different from the first manufacturing method in that an adhesion step of further making inorganic particles adhere to the laminated mat surfaces is performed after the laminating step.

Additionally, in the second manufacturing method, similarly to the method for manufacturing a retaining seal material related to the first embodiment of the invention, the retaining seal material related to the second embodiment of the invention can be manufactured by changing the particle diameter of the inorganic particles in the impregnating step and the adhesion step.

The impregnating step and the adhesion step in the second manufacturing method will be described below.

(b) Impregnating Step

In the impregnating step of the first manufacturing method, the particle diameter of the inorganic particles impregnated in the second mat is adjusted so as to become smaller than the particle diameter of the inorganic particles impregnated in the first mat and the third mat. On the other hand, in the impregnating step of the second manufacturing method, the particle diameters of the inorganic particles impregnated in the respective mats may be the same as or different from each other, respectively. However, in the impregnating step of the second manufacturing method, it is necessary to make the particle diameter of the inorganic particles impregnated in the mat (not limited to the second mat) where the vicinity of the center in the thickness direction of the retaining seal material is located smaller than the particle diameter of the inorganic particles in the adhesion step.

Other than the above, this impregnating step is the same as the impregnating step in the first manufacturing method.

(f) Adhesion Step

An adhesion step of further making inorganic particles adhere to the first principal surface and second principal surface of the mats laminated through the adhesion step is performed.

In the adhesion step, a method for making inorganic particles adhere to the first principal surface and second principal surface of the mats is as described in the first embodiment of the invention.

By adjusting the particle diameter of the inorganic particles to be used for the adhesion step, the mean particle diameters of the inorganic particles in the vicinity of the first principal surface and the vicinity of the second principal surface in the retaining seal material of the present embodiment are desirably adjusted so as to become 0.1 µm to 1 µm.

Other conditions or the like in the adhesion step are as described in the first embodiment of the invention.

The mats that have undergone the steps up to this step become the retaining seal material related to the second embodiment of the invention. Additionally, in order to obtain the retaining seal material of a shape including the convex portion and the concave portion as shown in FIG. 9, a cutting step of cutting the retaining seal material into a predetermined shape may be further performed.

In the second method, in order to change the mean particle diameters of the inorganic particles in the respective regions by the adhesion step, the vicinity of the center in the thickness direction of the retaining seal material may be located in any mat. Therefore, the thicknesses of the respective mat are not necessarily equal to or more than 1 mm, respectively, and are not particularly limited.

Since the exhaust gas purifying apparatus related to the second embodiment of the invention is the same as the exhaust gas purifying apparatus related to the first embodiment of the invention except that the retaining seal material related to the second embodiment of the invention is used, the detailed description thereof is omitted.

In the retaining seal material and the exhaust gas purifying apparatus related to the second embodiment of the invention, the effects (1) to (5) described in the first embodiment of the invention are exhibited.

Third Embodiment

A third embodiment that is an embodiment of a retaining seal material and an exhaust gas purifying apparatus of the invention will be described below.

The third embodiment of the invention is different from the first embodiment of the invention in that a mat that constitutes a retaining seal material is sheeted.

Since the retaining seal material related to the third embodiment of the invention has almost the same configuration as the retaining seal material related to the first embodiment of the invention, the detailed description thereof is omitted.

An example of a method for manufacturing a retaining seal material related to the third embodiment of the invention will be described.

A method for manufacturing a retaining seal material related to a third embodiment of the invention includes: a mat preparing step of preparing a mat containing inorganic fibers and inorganic particles adhering to the surfaces of the inorganic fibers; and an adhesion step of further making inorganic particles adhere to the surface of the mat.

In the above manufacturing method, the retaining seal material related to the third embodiment of the invention can be manufactured by changing the particle diameters of the inorganic particles in a mixed solution preparing step in the mat preparing step to be described below, and the adhesion step.

(a) Mat Preparing Step

First, a mat preparing step of preparing a sheeted mat is performed.

Although the mat that constitutes the retaining seal material related to the second embodiment of the invention can be obtained by various methods, the mat can be manufactured by, for example, the following method.

(a-1) Mixed Solution Preparing Step

Alumina fibers, silica fibers, an inorganic binder containing inorganic particles, and water are mixed so that the content of inorganic fibers (alumina fibers and silica fibers) in an undiluted solution becomes a predetermined value, and are agitated by an agitator to prepare a mixed solution. An organic binder may be contained in the mixed solution if needed.

In addition, in the above preparation, the mean particle diameter of the inorganic particles in the vicinity of the center in the thickness direction of the retaining seal material is desirably adjusted so as to become 0.005 µm to 0.1 µm.

As the inorganic binder, for example, the inorganic binder to be used in the impregnating step described in the first embodiment of the invention can be used.

(a-2) Sheeting Step

Next, a mat precursor is made by removing the water in the mixed solution via meshes after pouring the mixed solution into a molding tank in which meshes for filtration are formed in a bottom face.

(a-3) Heating and Compressing Step

A mat having a predetermined bulk density is made by heating and compressing the mat precursor on predetermined conditions. By undergoing this step, the alumina fibers and the silica fibers are anchored to each other via the inorganic binder, and the shape of the mat is retained.

Thus, the inorganic particles originating from the inorganic binder adhere to the surfaces of the inorganic fibers contained in the made mat.

(b) Adhesion Step

Next, an adhesion step of further making inorganic particles adhere to the first principal surface and second principal surface of the mat prepared in the mat preparing step is performed.

In the adhesion step, a method for making inorganic particles adhere to the first principal surface and second principal surface of the mats is as described in the first embodiment of the invention.

By adjusting the particle diameter of the inorganic particles to be used for the adhesion step, the mean particle diameters of the inorganic particles in the vicinity of the first principal surface and the vicinity of the second principal surface in the retaining seal material of the present embodiment are desirably adjusted so as to become 0.1 μm to 1 μm.

In addition, the particle diameter of the inorganic particles made to adhere to the first principal surface of the mat may be the same as or different from the particle diameter of the inorganic particles made to adhere to the second principal surface.

Additionally, the type of the inorganic particles to be used for the adhesion step may be the same as or different from the type of the inorganic particles to be used for the mixed solution preparing step. Moreover, the type of the inorganic particles made to adhere to the first principal surface of the mat and the type of the inorganic particles made to adhere to the second principal surface of the mat may be the same as or different from each other.

Other conditions or the like in the adhesion step are as described in the first embodiment of the invention.

The mat that has undergone the steps up to this step becomes the retaining seal material related to the third embodiment of the invention.

Additionally, in order to obtain the retaining seal material of a shape including a convex portion and a concave portion, a cutting step of cutting the retaining seal material into a predetermined shape may be further performed.

Since the exhaust gas purifying apparatus related to the third embodiment of the invention is the same as the exhaust gas purifying apparatus related to the first embodiment of the invention except that the retaining seal material related to the third embodiment of the invention is used, the detailed description thereof is omitted.

In the retaining seal material and the exhaust gas purifying apparatus related to the third embodiment of the invention, the effects (1) to (5) described in the first embodiment of the invention are exhibited.

Other Embodiments

In the retaining seal material related to the first embodiment of the invention, the mean particle diameter of the inorganic particles in the vicinity of the center in the thickness direction of the retaining seal material is smaller than both the mean particle diameters of the inorganic particles in the vicinity of the first principal surface and the vicinity of the second principal surface. However, a retaining seal material in which the mean particle diameter of the inorganic particles in the vicinity of the center in the thickness direction of the retaining seal material is smaller than any one of the mean particle diameters of the inorganic particles in the vicinity of the first principal surface and the vicinity of the second principal surface is also included in the retaining seal material of the embodiment of the present invention.

The retaining seal material as described above can be manufactured by making inorganic particles adhere to any one of the first principal surface and second principal surface of the mat in (e) adhesion step after the steps up to (a) mat preparing step, (b) impregnating step, (c) dewatering step, and (d) drying step, which are described in the first embodiment of the invention, are similarly performed.

In the retaining seal material of the embodiment of the present invention, the mean particle diameters of the inorganic particles in other portions are not limited as long as the mean particle diameter of the inorganic particles in the vicinity of the center in the thickness direction of the retaining seal material is smaller than at least one of the mean particle diameter of the inorganic particles in the vicinity of the first principal surface and the mean particle diameter of the inorganic particles in the vicinity of the second principal surface.

However, the mean particle diameters of the inorganic particles in portions other than the vicinity of the first principal surface and the vicinity of the second principal surface are desirably smaller than the mean particle diameters of the inorganic particles in the vicinity of the first principal surface and the vicinity of the second principal surface from a viewpoint of the flexibility of the retaining seal material.

In the second embodiment of the invention, the retaining seal material includes three mats. However, a retaining seal material including two mats or a retaining seal material including four or more mats is also included in the retaining seal material of the embodiment of the present invention.

The above retaining seal material including two mats can be manufactured by the second manufacturing method of a retaining seal material in the second embodiment of the invention.

Additionally, the above retaining seal material including four or more mats can be manufactured by the first manufacturing method or second manufacturing method of a retaining seal material in the second embodiment of the invention.

In the second embodiment of the invention, all the mats that constitute the retaining seal material are the mats made of the inorganic fibers subjected to the needle punching. However, a retaining seal material that is formed as a mat made of the inorganic fibers subjected to the needle punching and a sheeted mat are arbitrarily laminated is also included in the retaining seal material of the embodiment of the present invention.

In the second embodiment of the invention, the retaining seal material includes the first mat, the second mat, and the third mat, and the vicinity of the center in the thickness direction of the retaining seal material is located in the second mat. However, in the retaining seal material of the embodiment of the present invention, the vicinity of the center in the thickness direction of the retaining seal material may not be necessarily located in the second mat.

In the retaining seal material of the embodiment of the present invention, in a case where the retaining seal material includes a plurality of mats, the thicknesses of the respective mats may be the same as or different from each other.

The shape of the secondary particles of the inorganic particles in the inorganic binder may be a fibrous shape, a rod shape, a beaded shape, a feathery shape, or a massive shape besides the above-described chain shape.

For example, additives, such as CaO, MgO, or $ZrO_2$, in addition to alumina may be contained in the alumina fibers.

The composition ratio of the alumina fibers and the silica fibers in a weight ratio is desirably $Al_2O_3:SiO_2$=60:40 to 80:20, and more desirably $Al_2O_3:SiO_2$=70:30 to 74:26.

For example, additives, such as CaO, MgO, or $ZrO_2$, in addition to silica may be contained in the silica fibers.

The biosoluble fibers are, for example, inorganic fibers containing at least a type of compound selected from a group consisting of an alkali metal compound, an alkaline earth metal compound, and a boron compound, besides silica or the like.

Since the biosoluble fibers made of these compounds are easily dissolved even if incorporated into a human body, a mat containing these inorganic fibers has excellent safety for the human body.

The specific composition of the biosoluble fibers includes a composition containing 60% by weight to 85% by weight of silica and at least 15% by weight to 40% by weight of a type of compound selected from a group consisting of an alkali metal compound, an alkaline earth metal compound, and a boron compound. The above silica means SiO or $SiO_2$.

Examples of the above alkali metal compound include oxides of Na and K, or the like and examples of the above alkaline earth metal compound include oxides of Mg, Ca, and Ba, or the like. The above boron compound includes an oxide of B, or the like.

In the composition of the biosoluble fibers, if the content of silica is less than 60% by weight, the biosoluble fibers are not easily made by a glass melting method, and are not easily fiberized.

Additionally, if the content of silica is less than 60% by weight, the biosoluble fibers are structurally weak because the content of silica having flexibility is little, and the biosoluble fibers have a tendency to be too easily dissolved in the physiological salt solution because the ratio of at least a type of compound selected from a group consisting of an alkali metal compound, an alkaline earth metal compound, and a boron compound becomes relatively high which are easily dissolved in a physiological salt solution.

On the other hand, if the content of silica exceeds 85% by weight, the biosoluble fibers have a tendency to be too difficultly dissolved in the physiological salt solution because the ratio of at least a type of compound selected from a group consisting of an alkali metal compound, an alkaline earth metal compound, and a boron compound becomes relatively low.

In addition, the content of silica is calculated by converting the amount of SiO and $SiO_2$ into that of $SiO_2$.

Additionally, the content of at least one type of compound selected from a group consisting of an alkali metal compound, an alkaline earth metal compound, and a boron compound in the composition of the biosoluble fibers is desirably 15% by weight to 40% by weight. Additionally, if the content of at least one type of compound selected from a group consisting of an alkali metal compound, an alkaline earth metal compound, and a boron compound is less than 15% by weight, the biosoluble fibers are not easily dissolved in the physiological salt solution.

On the other hand, if the content of a type of compound selected from a group consisting of an alkali metal compound, an alkaline earth metal compound, and a boron compound exceeds 40% by weight, the biosoluble fibers are not easily made by the glass melting method, and are not easily fiberized. Additionally, if the content of a type of compound selected from a group consisting of an alkali metal compound, an alkaline earth metal compound, and a boron compound exceeds 40% by weight, the biosoluble fibers are structurally weak and are too easily dissolved in the physiological salt solution.

The solubility of the above biosoluble fibers to the physiological salt solution is desirably equal to or more than 30 ppm. This is because, if the solubility of the biosoluble fibers is less than 30 ppm, in a case where inorganic fibers are incorporated into a human body, the inorganic fibers are not easily discharged to the outside of the body and are not preferable in terms of health.

The glass fibers are glassy fibers that have silica and alumina as principal components and contain calcia, titania, zinc oxide, or the like besides the alkali metal.

Although the basis weight (weight per unit area) of the retaining seal material related to the embodiment of the invention is not particularly limited, the basis weight is desirably 200 $g/m^2$ to 4000 $g/m^2$, and more desirably 1000 $g/m^2$ to 3000 $g/m^2$. The retaining force is not sufficient if the basis weight of the retaining seal material is less than 200 $g/m^2$, and the bulk of the retaining seal material cannot become low easily if the basis weight of the retaining seal material exceeds 4000 $g/m^2$. Therefore, in a case where an exhaust gas purifying apparatus is manufacturing using such a retaining seal material, the exhaust gas treatment body easily comes off from the metal casing.

Additionally, although the bulk density (the bulk density of the retaining seal material before canning) of the retaining seal material related to the embodiment of the invention is not particularly limited, the bulk density is desirably 0.10 $g/cm^3$ to 0.50 $g/cm^3$. If the bulk density of the retaining seal material is less than 0.10 $g/cm^3$, the shape of the retaining seal material is not easily maintained in a predetermined shape because the entanglement between the inorganic fibers is weak and the inorganic fibers are easily peeled off.

Additionally, if the bulk density of the retaining seal material exceeds 0.50 $g/cm^3$, the retaining seal material becomes hard, the winding property to the exhaust gas treatment body deteriorates, and the retaining seal material cracks easily.

Although the thickness of the retaining seal material related to the embodiment of the invention is not particularly limited, the thickness is desirably 3.0 mm to 20 mm, and more desirably 6.0 mm to 20 mm.

If the thickness of the retaining seal material is less than 3.0 mm, the retaining force is not sufficient. Therefore, in a case where an exhaust gas purifying apparatus is manufactured using such a retaining seal material, the exhaust gas treatment body easily comes off from the metal casing. Additionally, if the thickness of the retaining seal material exceeds 20 mm, since the retaining seal material becomes too thick, the winding property to the exhaust gas treatment body deteriorates, and the retaining seal material cracks easily.

In a case where the organic binder is used, the type thereof is not particularly limited, and includes, for example, epoxy resin, acrylate resin, rubber-based resin, styrene-based resin, or the like.

Among the above organic binders, the rubber-based resin (latex) or the like is preferable. Examples of the organic binder containing liquid containing the organic binder include a solution in which water-soluble organic polymers, such as carboxymethylcellulose or polyvinyl alcohol, are dissolved, latex in which acrylic rubber, acrylonitrile butadiene rubber, or styrene butadiene rubber is dispersed in water, or the like.

The retaining seal material of the embodiment of the present invention has indispensable constituent requirements that the retaining seal material contains inorganic fibers and inorganic particles adhering to the surfaces of the inorganic fibers, and includes a first principal surface and a second principal surface, and the mean particle diameter of the inorganic particles in the vicinity of the center in a thickness direction of the retaining seal material is smaller than at least any one of the mean particle diameter of the inorganic particles in the vicinity of the first principal surface and the mean particle diameter of the inorganic particles in the vicinity of the second principal surface.

Desired effects can be obtained by appropriately combining the relevant indispensable constituent requirements with various configurations (for example, the distribution of the mean particle diameter of the inorganic particles, the type of the inorganic fibers, the presence/absence of the organic binder, the manufacturing method of the mat, or the like), which are described in detail in the first embodiment of the invention and the other embodiments of the invention.

Obviously, numerous modifications and variations of the present invention are possible in light of the above teachings. It is therefore to be understood that within the scope of the appended claims, the invention may be practiced otherwise than as specifically described herein.

The invention claimed is:

1. A retaining seal material comprising:
   inorganic fibers;
   inorganic particles adhering to surfaces of the inorganic fibers;
   a first principal surface;
   a second principal surface; and
   a mean particle diameter of the inorganic particles in a vicinity of a center in a thickness direction of the retaining seal material being smaller than at least one of a mean particle diameter of the inorganic particles in a vicinity of the first principal surface and a mean particle diameter of the inorganic particles in a vicinity of the second principal surface.

2. The retaining seal material according to claim 1, wherein the mean particle diameter of the inorganic particles in the vicinity of the center in the thickness direction of the retaining seal material is smaller than both the mean particle diameter of the inorganic particles in the vicinity of the first principal surface and the mean particle diameter of the inorganic particles in the vicinity of the second principal surface.

3. The retaining seal material according to claim 1, wherein the mean particle diameter of the inorganic particles in the vicinity of the center in the thickness direction of the retaining seal material is 0.005 μm to 0.1 μm.

4. The retaining seal material according to claim 1, wherein at least one of the mean particle diameter of the inorganic particles in the vicinity of the first principal surface and the mean particle diameter of the inorganic particles in the vicinity of the second principal surface is 0.1 μm to 1 μm.

5. The retaining seal material according to claim 1, further comprising an organic binder.

6. The retaining seal material according to claim 1, wherein the retaining seal material includes a single mat, and the single mat is a mat made of the inorganic fibers subjected to needle punching.

7. The retaining seal material according to claim 1, wherein the retaining seal material includes a plurality of mats, and at least one mat of the plurality of mats is a mat made of the inorganic fibers subjected to needle punching.

8. An exhaust gas purifying apparatus comprising:
   an exhaust gas treatment body;
   a metal casing that houses the exhaust gas treatment body; and
   the retaining seal material according to claim 1 disposed between the exhaust gas treatment body and the metal casing and retains the exhaust gas treatment body.

* * * * *